United States Patent
Ametsitsi

(10) Patent No.: US 7,907,580 B2
(45) Date of Patent: Mar. 15, 2011

(54) LAN ACCESS BY ULTRA-WIDEBAND SYSTEM AND METHOD

(75) Inventor: Julius Ametsitsi, Marysville, WA (US)

(73) Assignee: Leviton Manufacturing Co., Inc., Melville, NY (US)

(*) Notice: Subject to any disclaimer, the term of this patent is extended or adjusted under 35 U.S.C. 154(b) by 758 days.

(21) Appl. No.: 11/669,040

(22) Filed: Jan. 30, 2007

(65) Prior Publication Data

US 2007/0183424 A1 Aug. 9, 2007

Related U.S. Application Data

(62) Division of application No. 11/668,458, filed on Jan. 29, 2007.

(60) Provisional application No. 60/762,973, filed on Jan. 27, 2006.

(51) Int. Cl.
*H04W 4/00* (2009.01)
(52) U.S. Cl. ......... 370/338; 370/401; 370/466; 709/238; 709/249
(58) Field of Classification Search .................. None
See application file for complete search history.

(56) References Cited

U.S. PATENT DOCUMENTS

| | | | | |
|---|---|---|---|---|
| 6,497,656 | B1* | 12/2002 | Evans et al. .................... | 600/300 |
| 7,046,716 | B1* | 5/2006 | Miao ............................. | 375/130 |
| 2003/0161279 | A1* | 8/2003 | Sherman ....................... | 370/328 |
| 2004/0054905 | A1* | 3/2004 | Reader .......................... | 713/171 |
| 2005/0147071 | A1* | 7/2005 | Karaoguz et al. ............. | 370/338 |
| 2005/0185669 | A1* | 8/2005 | Welborn et al. ............... | 370/465 |
| 2005/0243787 | A1* | 11/2005 | Hong et al. .................... | 370/338 |
| 2007/0081505 | A1* | 4/2007 | Roberts ......................... | 370/338 |
| 2009/0285189 | A1 | 11/2009 | Kim et al. | |

OTHER PUBLICATIONS

U.S. Appl. No. 11/668,458, filed Jan. 29, 2007, Ametsitsi, Julius.

* cited by examiner

*Primary Examiner* — Daniel J Ryman
*Assistant Examiner* — Brian Roberts
(74) *Attorney, Agent, or Firm* — Davis Wright Tremaine LLP; George C. Rondeau, Jr.; Heather M. Colburn

(57) ABSTRACT

An ultra-wideband (UWB) system and method provide a local area network (LAN) and/or LAN access. LAN access versions of the UWB system includes an emulator layer and bridge that allow data to be transmitted between a LAN-UWB hybrid device and a LAN network switch, such as an IEEE 802 network switch, through in part a UWB node of a UWB WPAN that can receive UWB super-frames from the LAN-UWB hybrid device. In some implementations the LAN-UWB hybrid device uses WiFi protocol layers above the emulator layer and a WiNet Peer IP PAL layer below the emulator layer.

34 Claims, 24 Drawing Sheets

LAN ACCESS BY ULTRA-WIDEBAND SYSTEM AND METHOD

CROSS REFERENCE TO RELATED APPLICATION

This application is a divisional application of U.S. Ser. No. 11/668,458 filed Jan. 29, 2007, which claims priority benefit of provisional application Ser. No. 60/762,973 filed Jan. 27, 2006.

BACKGROUND OF THE INVENTION

1. Field of the Invention

The present invention is directed generally to data network communication.

2. Description of the Related Art

Wi-Fi is used to identify a technology directed to wireless local area networks (WLAN) based on the IEEE 802.11 specifications (including 802.11, 802.11a, 802.11b, 802.11g). The technology can be used for mobile computing devices, such as laptops, in LANs, and other device connectivity. Both the 802.11 family of networking protocols and the 802.3 family of networking protocols involves an area of networking sometimes referred to as infrastructure networking that is related to networking other than peer-to-peer networking.

802.11 has a maximum bandwidth of 2 Mbps, which can be too small for many applications. 802.11b supports bandwidth up to 11 Mbps, which is comparable to traditional IEEE 802.3 and other Ethernet versions. 802.11a supports bandwidth up to 54 Mbps and signals in a regulated frequency spectrum around 5 GHz. Compared with 802.11b, 802.11a is faster, supports more simultaneous users, and uses regulated frequencies to prevent signal interference from other devices. 802.11a has a shorter range signal that is more easily obstructed than 802.11b. 802.11b uses the same radio signaling frequency as the original 802.11 standard whereas 802.11a uses higher frequency. 802.11g has bandwidth up to 54 Mbps with a comparably large number of simultaneous users, uses the 2.4 Ghz frequency for greater range and relatively high resistance to obstruction, and is backwards compatible with 802.11b. Unfortunately, since 802.11g uses the same unregulated frequency range as 802.11b it can also experience interference with appliances that has caused problem for 802.11b.

As defined by the U.S. Federal Communications Commission (FCC), ultra-wideband (UWB) in general refers to a radio technology having bandwidth larger than 500 MHz or 25% of the center frequency. To its credit, UWB is able to share spectrum between users. In 2002, the FCC authorizes unlicensed use of UWB in a portion of the radio spectrum between 3.1 GHz and 10.6 GHz. Consequently, various communication technologies can share this portion of the radio spectrum due also to the inherent ability of UWB to share spectrum between devices. Some of these technologies can range from radar, imaging systems, and short range and long range data communication.

The short duration of UWB pulses allows for very high data rates and has allowed UWB technology to emerge in the area of wireless personal area network (WPAN) transmission systems with bandwidths of at least 500 MHz or a signal occupying an instantaneous fractional bandwidth (BW) of at least 20%. The WPAN technology utilizes point-to-point or peer-to-peer communication directly between two devices as opposed to other types of network traffic found on local area networks (LAN). UWB technology used for WPANs enables the transmission of very high data rates, such as up to 480 Mbps, at a range less than 10 meters, which is a range suitable for a WPAN. UWB also has the potential for upward scalability (up to 1 Gbps) and the throughput capability of multiple streams of simultaneous high definition video/multimedia/data payload.

The following key application areas for UWB technology have been identified in the UWB community: 1. wireless video connection between set top boxes and/or digital video disk (DVD) players and display devices such as monitors and projectors; 2. multiple high definition television (HDTV) video stream transmission from server to multiple clients/terminals; 3. synchronized transmission of HDTV video streams from video server to wide screen or multi-screen display systems; 4. computing equipment interconnection with universal serial bus (USB)-over-UWB (wireless USB); and 5. consumer equipment interconnection using IEEE1394-over-UWB (wireless IEEE1394) and/or co-existent wireless USB.

Standards for implementing WPANs using UWB radio transceivers are defined by the WiMedia Alliance and address issues such as data sharing and transmission within WPANs. The UWB/WiMedia conventional standards are directed toward peer-to-peer data sharing or transmission with WPANs. Pursuant to these standards, WPAN systems have been developed to provide methods of adaptation to standard protocol layers such as a peer-to-peer wireless universal serial bus (WUSB) such with a conventional UWB WUSB device 10 shown in FIG. 1. The UWB WUSB device 10 has a USB application layer 12 that passes data through a USB protocol adaptation layer (PAL) 14 and furthermore through a WiMedia WPAN UWB MAC layer 16 to transmit the data through a UWB physical layer 18 in the assigned UWB radio frequency spectrum.

The USB PAL 14 is used to enable communication between conventional USB application layer 12 that was originally designed for use with other forms of MACs for other physical media such as USB cabling. The USB PAL 14 packages data and instructions from the USB application layer 12 to conform with the WiMedia WPAN UWB MAC layer 16.

In the WiMedia WPAN UWB MAC layer 16, timing between UWB devices is based on super-frame time periods. Features of the WiMedia WPAN UWB MAC layer 16 include decentralized device operations and a combined use of a carrier sense multiple access (CSMA) protocol portion and time division multiple access (TDMA) protocol portion. A beacon portion of each super-frame time period serves as the initial timing portion of the super-frame period in which the UWB devices of a WPAN have autonomous access to the WPAN and identify themselves with individualized beacons. Through the TDMA protocol portion, reservations are announced during the beacon portion and a distributed reservation protocol (DRP) is used for isochronous data or other time-critical data. In turn, the CSMA protocol portion is used as the medium access method with prioritized contention access (PCA). Furthermore, each super-frame time period includes 256 medium access slots (MAS) with the WiMedia WPAN UWB MAC layer 16 providing security and encryption to prevent unauthorized access.

One implementation of the UWB physical layer 18 has a total frequency allocation of 3.1 GHz to 10.6 GHz, 14 bands each with a band width of 528 MHz. It uses 128 point orthogonal frequency division multiplexing (OFDM) with 100 data, ten guard, 12 pilot and six null subcarriers. Mandatory data rates of 53.3, 106.7 and 200 Mb/s are specified while 80, 160, 320, 400 and 480 Mb/s are optional. A total of five band groups are defined with group one being mandatory. There are four groups of three bands each and one group of two bands, yielding a total of 30 channels.

Other standard protocol layers, namely TCP and IP protocol layers, have been adopted for use with UWB for other peer-to-peer communication between devices so enabled such as shown in FIG. 2 with a conventional peer IP device 20 having TCP/IP layers 22. The TCP/IP layers 22 pass data through a WiNet peer IP PAL 24 and furthermore through the WiMedia WPAN UWB MAC layer 16 to transmit the data through the UWB physical layer 18. The WiNet peer IP PAL 24 generates a WiNet frame 30 having a WiNet portion 32 to contain among other things peer-to-peer networking information such as peer-to-peer addressing, a destination address portion 34, a source address 36, and a data portion 38. The WiNet peer IP PAL 24 places peer-to-peer information 40 that is above the IP layer, such as found in a peer-to-peer implementation of TCP into the data portion 38 of the WiNet Frame 30. The WiNet peer IP PAL 24 places a WiNet destination IP address 42 and a WiNet source IP address 44 into the destination address portion 34 and the source address portion 36. The WiNet peer IP PAL 24 passes the WiNet frame 30 on to the WiMedia WPAN UWB MAC 16, which then processes the WiNet frame to be placed into a UWB super-frame 50 as positioned between the two beacon slots 52 of the super-frame to occupy a slot 54.

Unfortunately, the high bandwidth of UWB technology remains dedicated to peer-to-peer communication being limited to the relatively small areas of individual personal area networks.

BRIEF DESCRIPTION OF THE SEVERAL VIEWS OF THE DRAWING(S)

Figure 9:
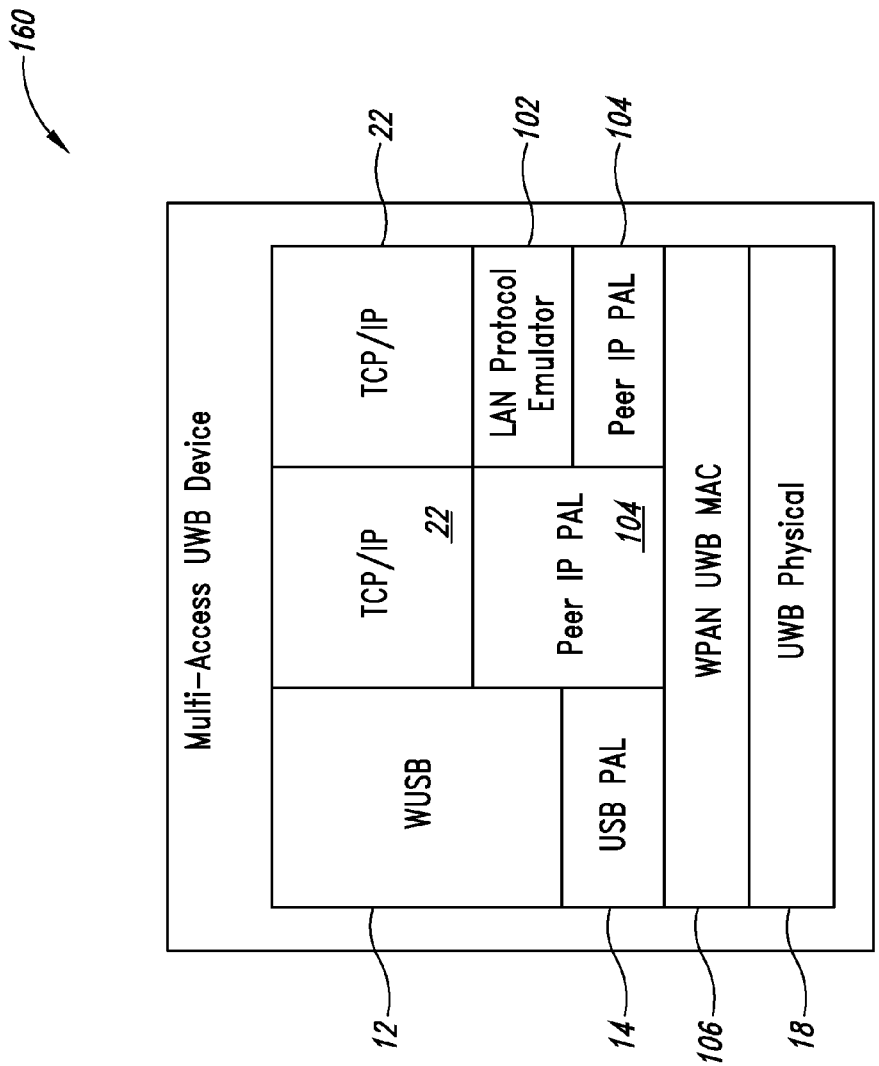
FIG. 9 is a diagram of a multi-access UWB device having the protocol stacks of the prior art UWB WUSB device of FIG. 1, the prior art Peer IP UWB device of FIG. 2, and the LAN-UWB hybrid device of FIG. 5.
Figure 17:
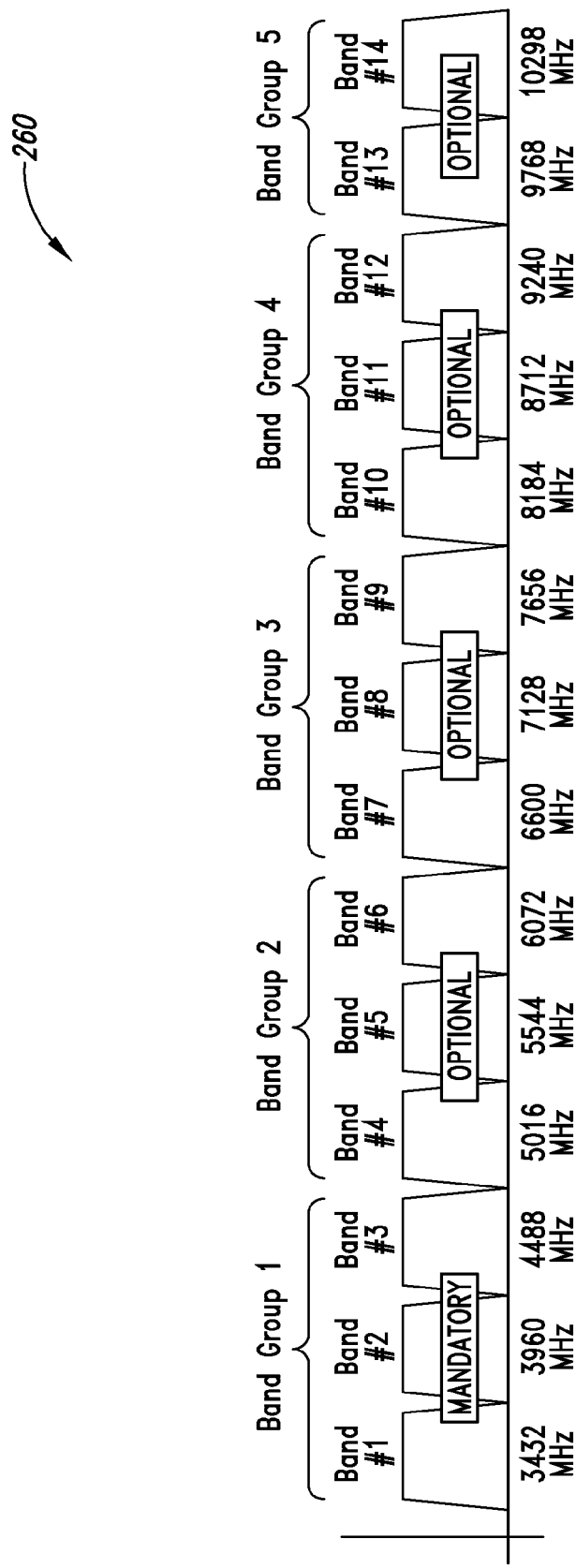
FIG. 17 is an UWB spectrum plot divided into five band groups, including a band group 1 noted as being mandatory and band groups 2-5 noted as optional.
Figure 18:
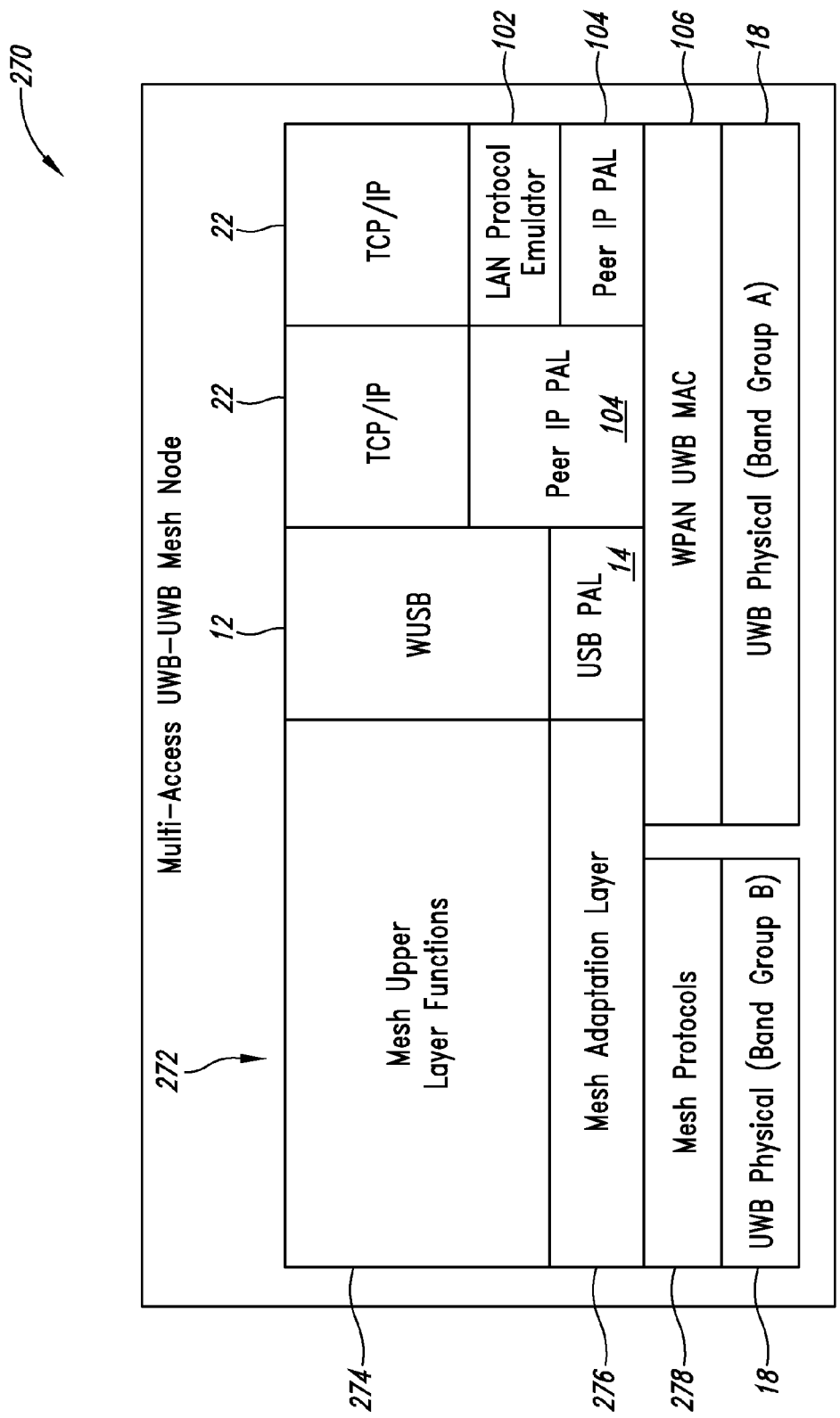

FIG. 18 is a diagram of a multi-access UWB-UWB mesh node that includes the protocol stacks of the multi-access UWB device of FIG. 9 that use a first UWB transceiver operating on a first one of the band groups of FIG. 17 (indicated as band group A), and an additional meshing protocol stack that uses a second UWB transceiver operating on a second one of the band groups of FIG. 17 (indicated as band group B).

Figure 10:
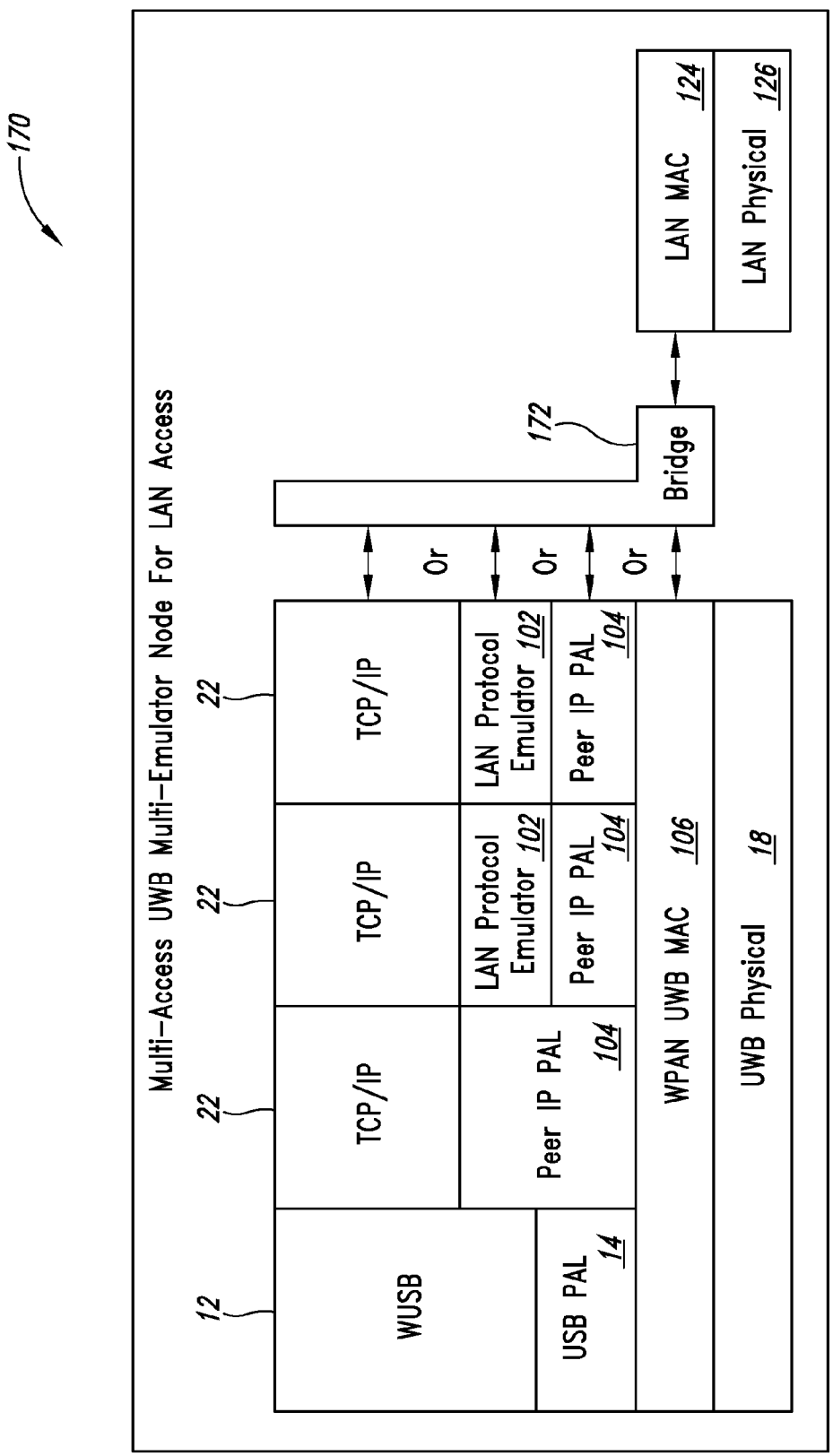
FIG. 10 is a diagram of a multi-access UWB multi-function node for LAN access having a bridge, the protocol stacks of the LAN UWB hybrid node of FIG. 8, and the multi-access UWB device of FIG. 9.
Figure 19:
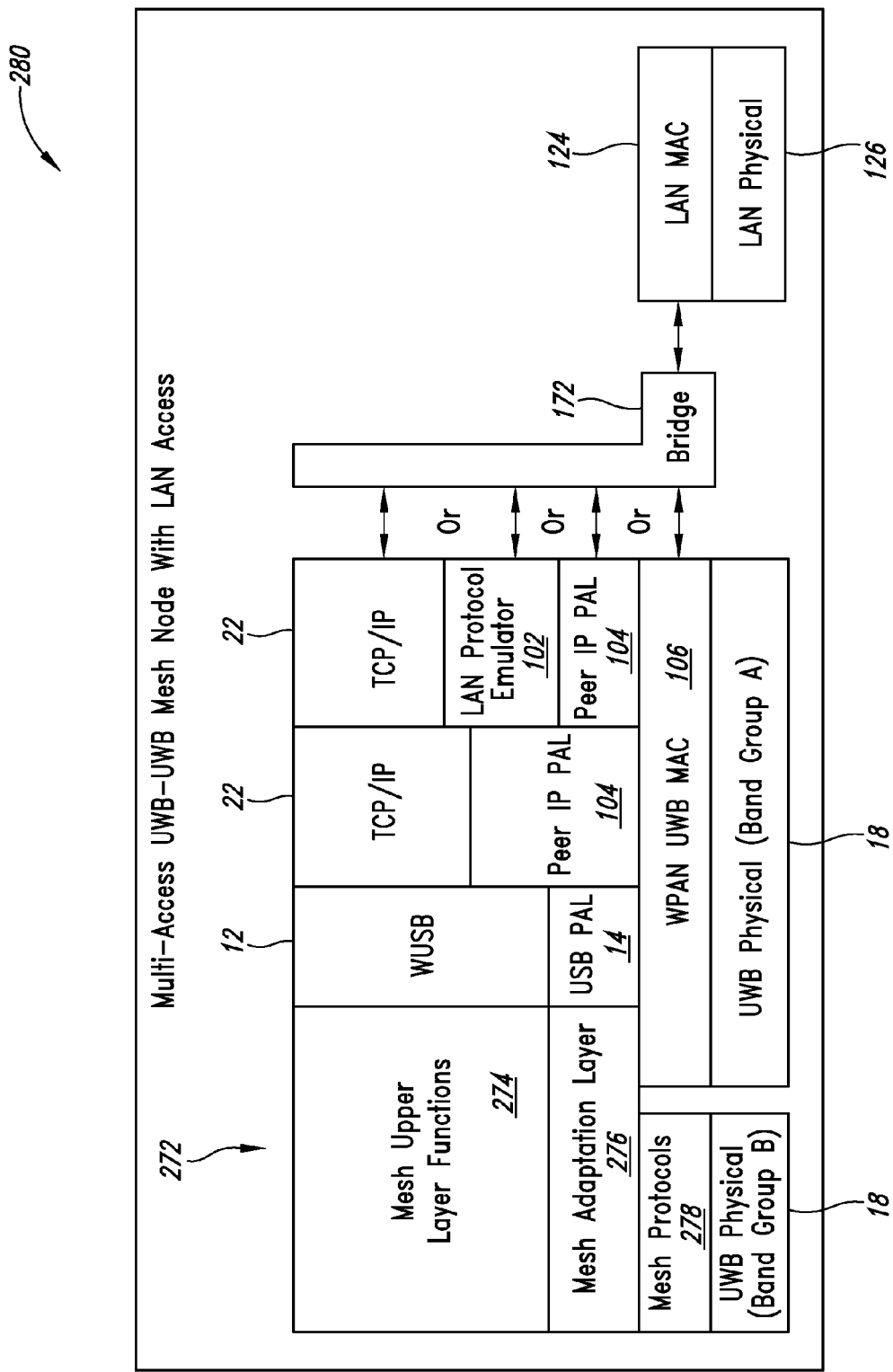

FIG. 19 is a diagram of a multi-access UWB-UWB mesh node with LAN access having the protocol stacks of the UWB-UWB mesh node of FIG. 18, the bridge of FIG. 10, and the second LAN MAC emulator protocol stack of the multi-access UWB multi-emulator node of FIG. 10.

Figure 20:
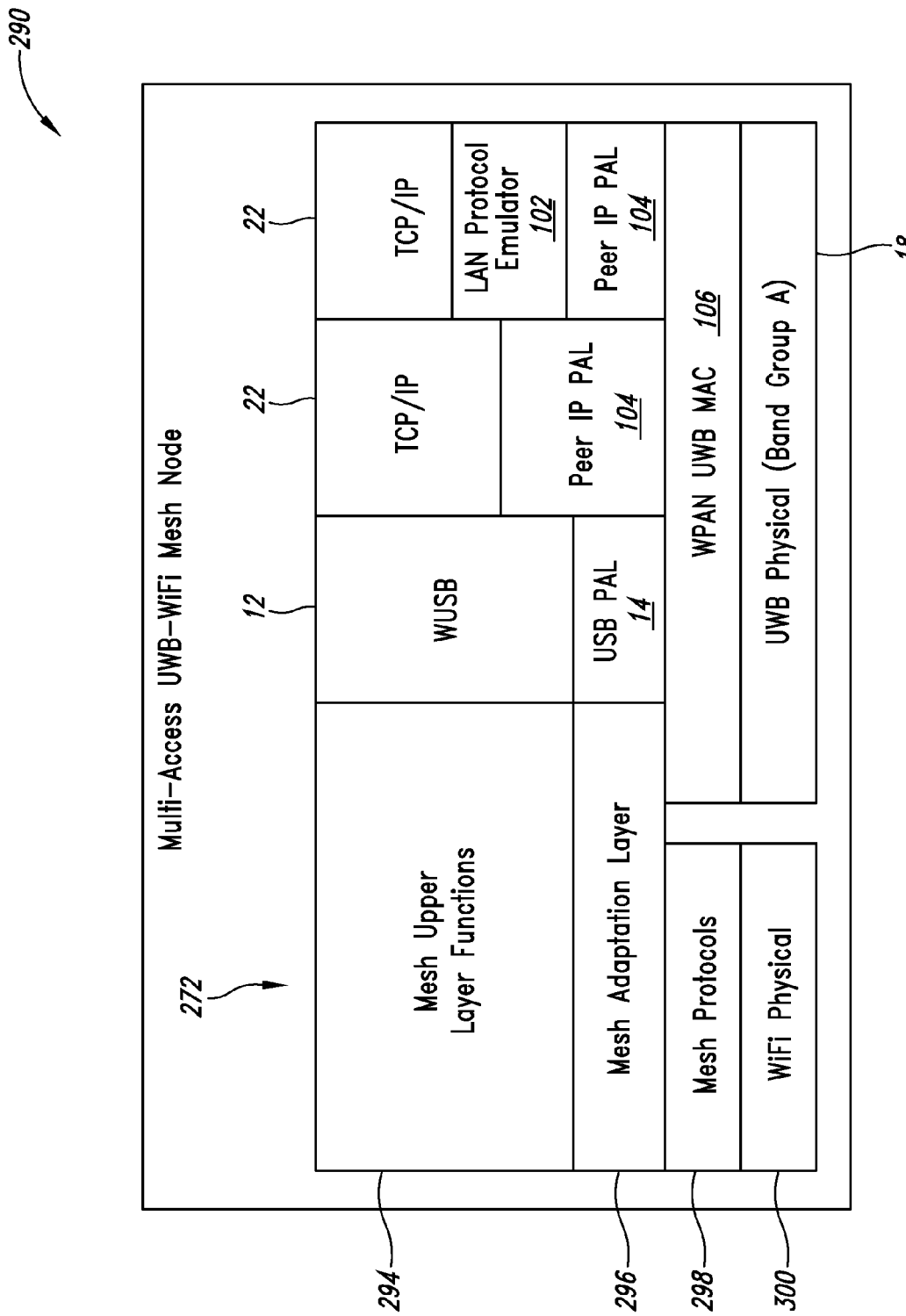

FIG. 20 is a diagram of a multi-access UWB-WiFi mesh node that has the functionality of the multi-access UWB-UWB mesh node of FIG. 18, and a protocol stack for meshing that is based upon WiFi.

Figure 21:
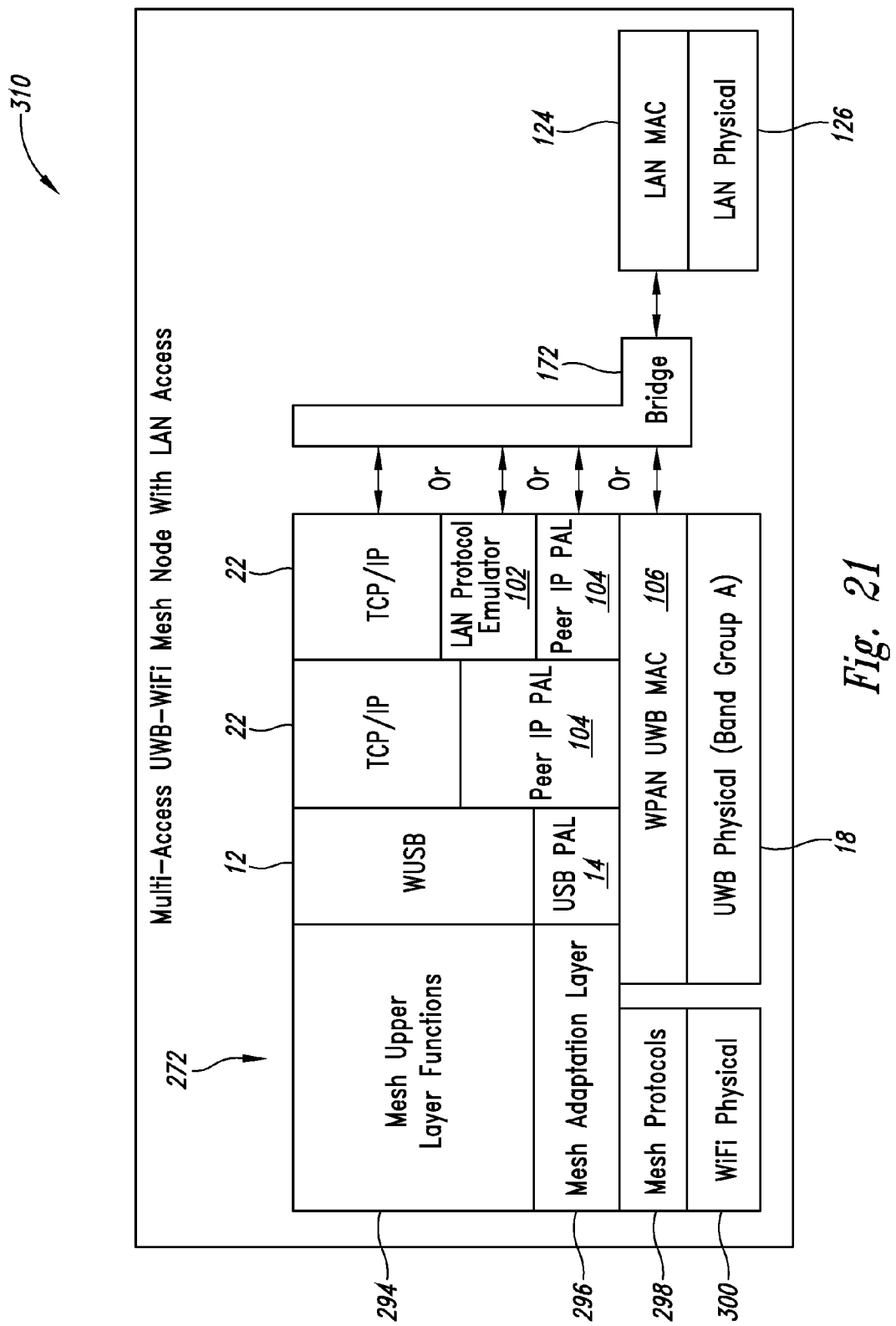

FIG. 21 is a diagram of a multi-access UWB-WiFi mesh node with LAN access that has the functionality of the multi-access UWB-UWB mesh node with LAN access of FIG. 19 and uses WiFi for meshing.

Figure 22:
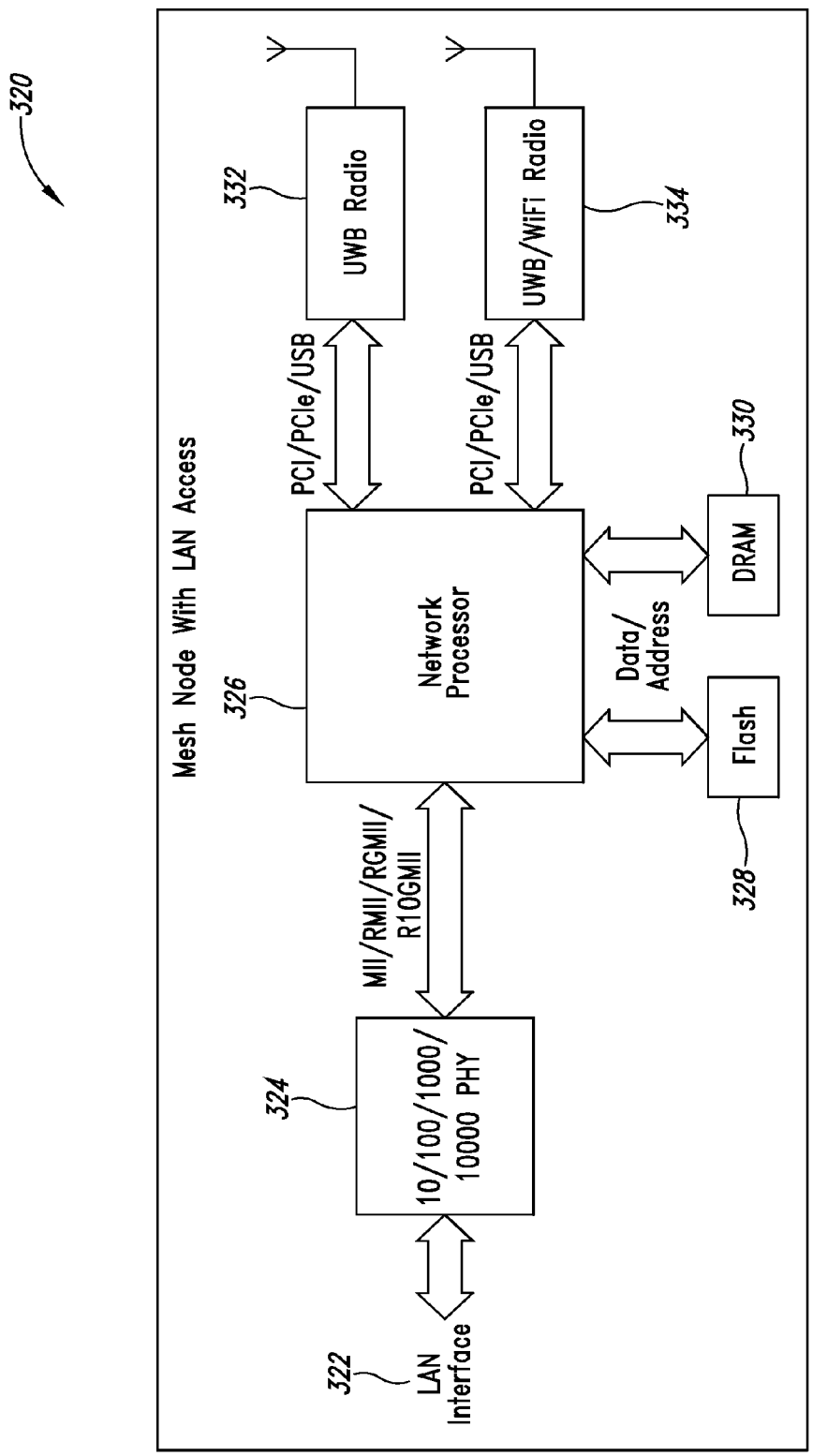

FIG. 22 is a diagram of a hardware implementation of the multi-access UWB-UWB mesh node of FIG. 19 and the multi-access UWB-WiFi mesh node of FIG. 21 that includes a LAN interface, a physical layer component, a network processor, flash memory, DRAM, a first UWB transceiver radio for data transmission, and a second transceiver radio for meshing.

Figure 23:
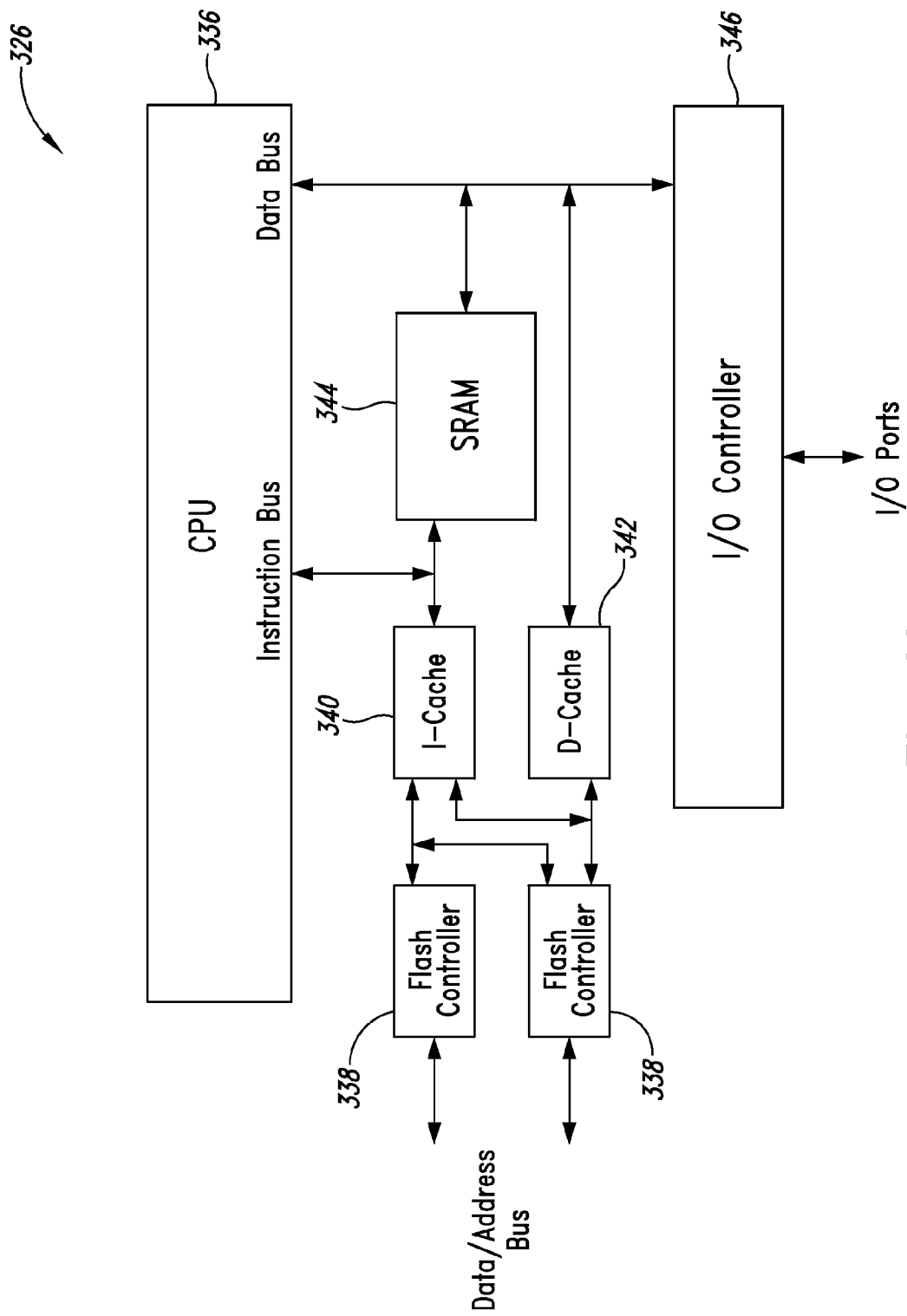

FIG. 23 is a diagram of an implementation of the network processor of FIG. 22.

Figure 11:
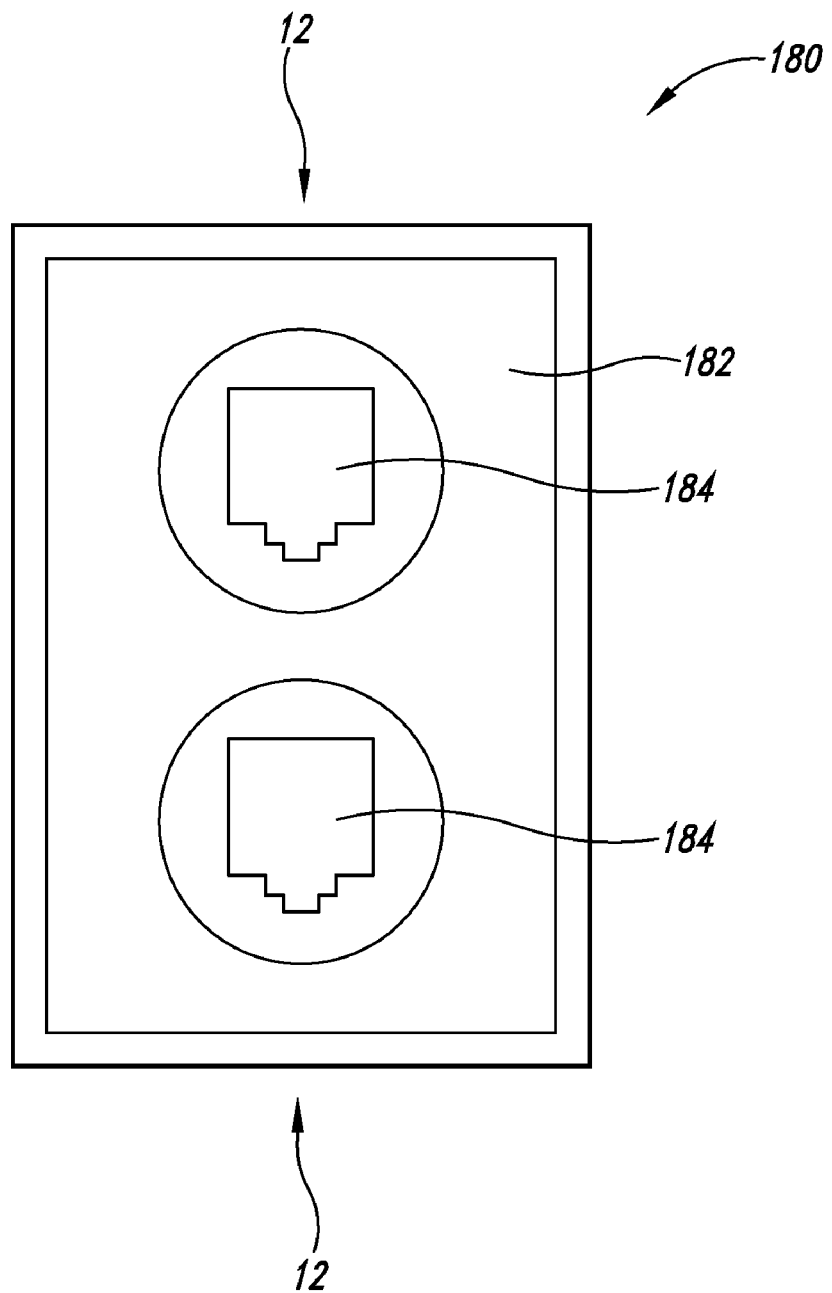
FIG. 11 depicts a wallplate having a cover plate and two RJ-45 jacks for connectivity with an IEEE 802 LAN such as LAN versions of IEEE 802.3.
Figure 24:
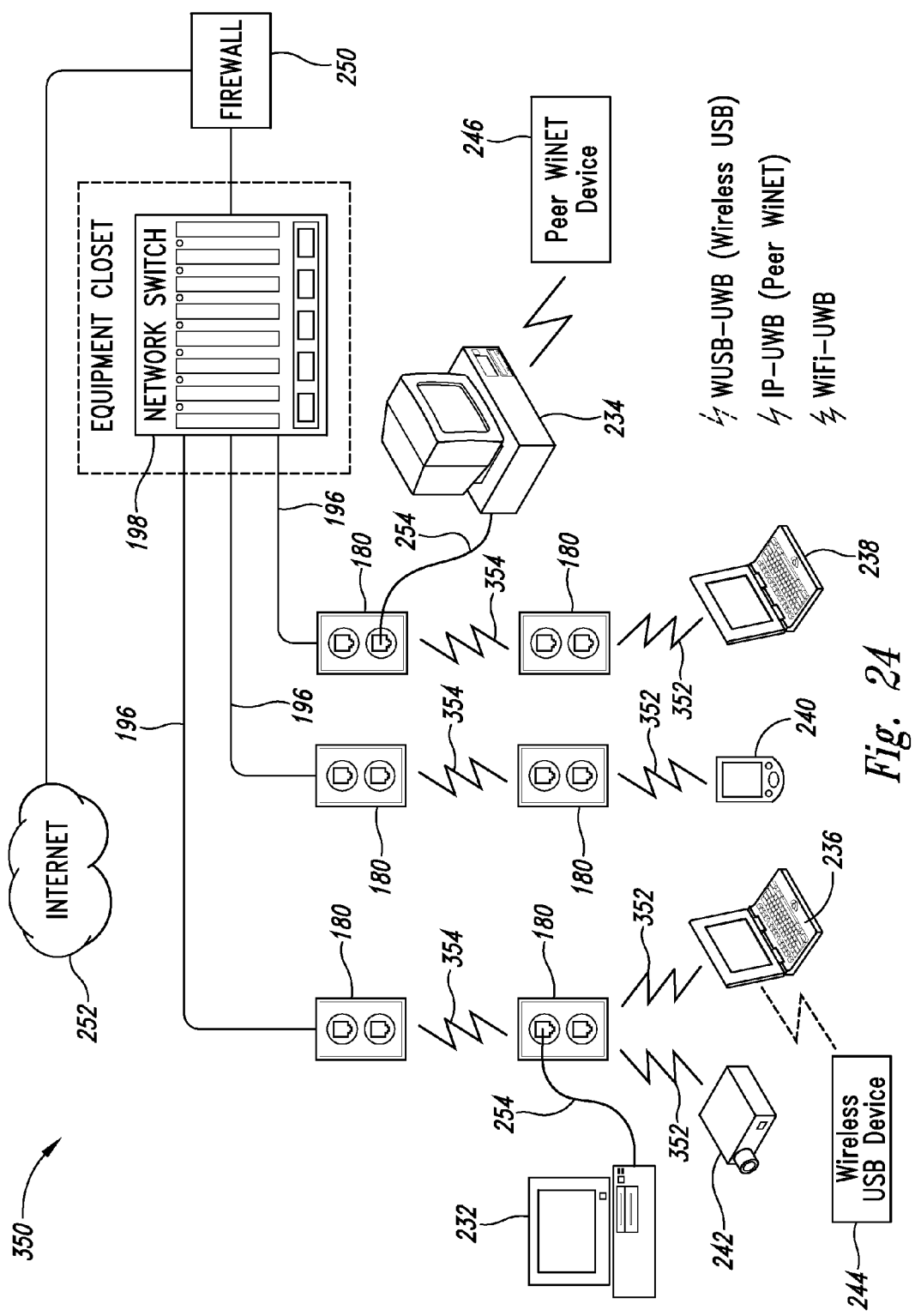

FIG. 24 is a diagram of a second exemplary topology in which originated super-frames are sent to a plurality of wallplates of FIG. 11 of the WPANs of the originating devices.

Figure 25:
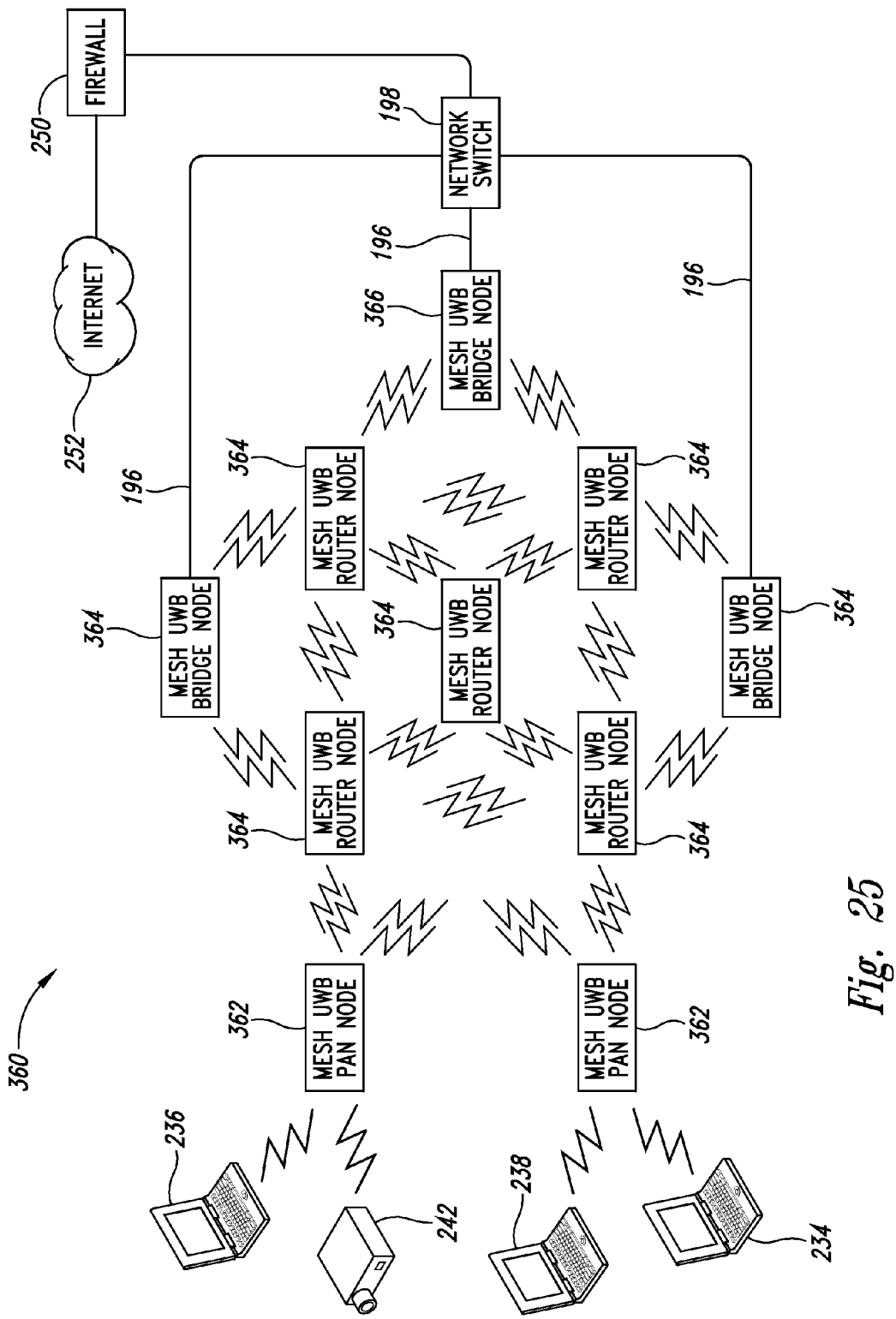

FIG. 25 is a diagram of a third exemplary topology having mesh WPAN nodes, mesh router nodes, and mesh bridge nodes.

DETAILED DESCRIPTION OF THE INVENTION

As will be discussed in greater detail herein, versions of an ultra-wideband (UWB) system and method provide a local area network (LAN) and/or LAN access. LAN access versions of the UWB system includes an emulator layer and bridge that allow data to be transmitted between a LAN-UWB hybrid device and a LAN network switch, such as an IEEE 802 network switch, through in part a UWB node of a UWB WPAN that can receive UWB super-frames from the LAN-UWB hybrid device. In some implementations the LAN- UWB hybrid device uses WiFi protocol layers above the emulator layer and a WiNet Peer IP PAL layer below the emulator layer.

LAN versions of the UWB system can direct data communication between two LAN-UWB hybrid devices each within the same UWB WPAN of the same UWB node or separate WPANs of the different UWB nodes. LAN (WiFi for some implementations) packets are generated by one or both of the LAN-UWB hybrid devices and are sent between each other through a network switch, such as an IEEE 802 network switch. In a simple configuration, the LAN-UWB hybrid devices are each coupled with the network switch through a UWB node that functions as WPAN node and also includes a bridge to a LAN that contains the network switch.

In more complex configurations, each LAN-UWB hybrid device is coupled with the network switch through a series of UWB nodes that have mesh components to tie the UWB nodes together. The series of UWB nodes can include a mesh UWB WPAN node that is located within a WPAN range of a subject LAN-UWB hybrid device and can also include a mesh UWB bridge node that bridges to a LAN that contains the network switch. In some versions, one or more mesh UWB router nodes can be located between the mesh UWB WPAN node and the mesh UWB bridge node to better route traffic between the mesh UWB WPAN node and the mesh UWB bridge node.

Implementations enhanced and adapt communication protocol stacks, (standards-defined or proprietary) to the Ethernet LAN data network model and incorporate resulting UWB data network architecture into a custom wall plate, which then acts as a wireless access point or node, and also wired point of connection, to support both multimedia and other types of network traffic. These data types are currently carried over Ethernet and/or asynchronous transfer mode ("ATM") wired networks in the typical office, commercial or home environment.

Implementations of a network wall plate includes one or more RJ45 jacks for connecting office equipment to the corporate or enterprise server network system. Implementations of the wall plate act as wired/wireless point of interface to a network switch/hub depending on whether the end-user is using such items as a wireless mobile device or a wired desktop computer. The unique characteristics of UWB, however, permit the compact design and packaging of a UWB access point or node in a single or dual gang wall plate.

By incorporating a compact UWB radio and its associated control/bridge modules, into a custom wall plate, the UWB-enabled wall plate acts as a wireless access point or node, as well as wired point of connection, through an RJ45 jack to the network.

When a wired device is not mobile, as with a desk top computer, it can be connected to the network by means of a Cat5/5e patch cord or other hard-wired connection. Both asynchronous network (TCP/IP) and multimedia/isochronous traffic can be carried over the UWB link or by wire to the end-user. By a method of protocol adaptation, a mobile or fixed computing device, such as a lap top or personal digital assistant ("PDA"), can access the same network through one or more UWB links to the network.

Implementations include flexibility with installation. UWB technology offers both LOS and Non-Line of Sight ("NLOS") transmission for robust communication between wireless access points or nodes and end-user devices within the range of transmission.

Implementations also incorporate the WiFi/Media Access Control ("MAC") emulation or protocol adaptation layers which are designed to support all MAC layer functions, such as scanning, Authentication, Association, security, Power Save Mode, Fragmentation, Clear To Send, Request To Send, and the like. In some implementations, the WiNet Protocol Adaptation Layer ("PAL") is modified through the WiFi/MAC emulation layer to function as a true peer-to-peer protocol or as a true infrastructure protocol. And the WiFi/MAC emulation layer and the WiNET PAL are designed to automatically request adjustments to time slot allocations throughout the network to adapt to the varying Ethernet-based end-user actions. On the client side, in some implementations, a computer card (EMUCard) emulates the MAC functions of an IEEE802.11 NIC card through hardware and/or firmware and/or software enhancements, thus allowing computer operating systems to access networks, such as LANs and WANs, with little or no modifications to device drivers and applications.

Implementations can include a translator function to bridge the Ethernet (IEEE 802.3) infrastructure to the ECMA/WiMedia WPAN-MultiBand Orthogonal Frequency Division Multiplexing Alliance domain (collectively "ECMA/WiMedia"). This translator function also implements the defined ECMA/WiMedia-Ethernet bridge behaviors in the same domain. This adaptation of the Ethernet infrastructure to the UWB based ECMA/WiMedia standards avoids the reinvention of a UWB network architecture for the integrated enterprise network and enables reuse of the mature resources (hardware and software) available for Ethernet standards.

Protocols of implementations also define a set of network layers for the UWB Radio architecture to model and emulate the behavior of the WiFi/Ethernet network both in infrastructure and ad-hoc frameworks. These extended protocols thus facilitate relatively seamless migration of LAN (IEEE 802) compatible applications to the UWB/WiMedia environments with little or no changes. Applications designed for Ethernet/WiFi environments, e.g. Transmission Control Protocol ("TCP"), User Datagram Protocol ("UDP") and Internet Protocol ("IP")) function equally well in the UWB/WiMedia network.

Implementations extend range of conventional UWB communication through use of dedicated radio based meshing to improve efficiencies and reduce load on data transfers.

Implementations are also directed to extension of the range of the conventional UWB technology for deployment in an integrated enterprise network system. Implementations include extensions of transmission range through a pseudo-mesh network topology with at least one UWB node dedicated to the emulation of the WiFi protocols (802.11b/g) and the IEEE 802.3 standards.

Hybrid wireless mesh networking of implementations provides routing solutions. Routing systems of some implementations do not use conventional military peer-to-peer mesh paradigm where all mesh radios are on the same channel. Instead, these implementations include routing technology that is enabled by using two mutually exclusive radios for each access point or node to perform the routing functions. These separate radios are on different spectra thereby eliminating the meshing problems found with conventional military peer-to-peer mesh routing paradigm concerning issues such as traffic inefficiencies. Implementations include a routing models constructed as a bridged dual domain distributed control systems.

Some UWB-WiFi implementations have pluralities of hybrid nodes each having two co-located radios, a shorter-range UWB radio and a longer-range WiFi (IEEE 802.11) radio. The longer range WiFi radios are dedicated to the meshing management functions and updates to routing tables in all nodes through real time route calculations. The shorter-range UWB radios use the shared database information to route multimedia and network traffic payloads to the respective destinations.

Other implementations use dual UWB radios with the second UWB radio serving meshing functions similar to the implementations using WiFi as the second radio per node. These implementations address range limitations of conventional UWB wireless devices by incorporating dual radios with multiple UWB band groups into a hybrid wireless mesh networking architecture without necessarily altering primary operational characteristics of WPAN protocol stacks. Furthermore, in cases of ad-hoc mesh topologies, a node can have a dual function as a router and data consumer therefore unable to maintain network reliability or accurate tracking of changes in topology due to node mobility or availability. These implementations using dual band group hybrid wireless mesh extension enables enhanced route recovery and other management services.

Figure 5:
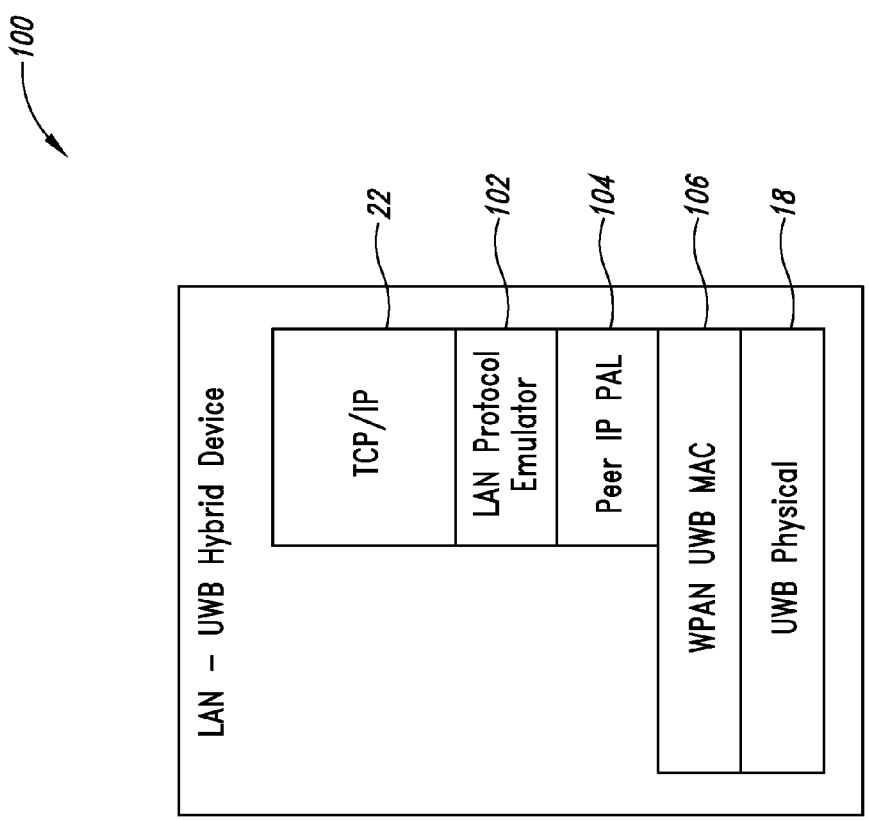
FIG. 5 is a diagram of a LAN-UWB hybrid device having TCP/IP protocol layers, a Local Area Network ("LAN") Media Access Control ("MAC") emulator, a peer IP Protocol Adaptation Layer ("PAL"), a wireless personal area network ("WPAN") UWB MAC, and an UWB physical layer.

A LAN-UWB hybrid device 100 is shown in FIG. 5 as having the TCP/IP protocol layers 22 (OSI layers 3 and 4) above a LAN MAC emulator 102 (as part of OSI layer 2), above a peer IP PAL, such as the peer-to-peer WiNet peer IP PAL 24. (as part of OSI layer 2), above a WPAN UWB MAC 106, such as the WiMedia WPAN UWB MAC 16 (as part of OSI layer 2), above the UWB physical layer 18 (OSI layer 1). The LAN MAC emulator 102 processes data and other communication to pass between the IP layer 22 and the peer IP PAL 104. The LAN MAC emulator 102 is able to process infrastructure networking instructions and information that contains networking instructions and information that is other than peer-to-peer networking instructions and information. This processing is of the LAN MAC emulator 102 is beyond the scope and capability of the peer IP PAL 104 since the peer IP PAL processes networking instructions and information related only to peer-to-peer networking and not infrastructure networking. The LAN MAC emulator 102 receives the infrastructure networking instructions and information from upper layers, such as the TCP/IP layers 22, and from application layers farther above the TCP/IP layers and satisfies the TCP/IP layers and the other upper layers that the networking instructions and information are being handled properly. Since the peer IP PAL 104 does not process infrastructure networking instructions and information, the LAN MAC emulator 102 packages infrastructure networking instructions and information into the data portion 38 of the WiNet frame 30 to be later unpackaged by an equivalent LAN MAC emulator of another node or device. In implementations the LAN MAC emulator 102 processes infrastructure networking instructions and information to include WIFi protocols and/or known as the IEEE 802.11 family of protocols (referred to herein as WiFi). In other implementations the LAN MAC emulator 102 processes infrastructure networking instructions and information to include Ethernet protocols and/or known as the IEEE 802.3 family of protocols.

In the WiFi family implementations (referred to herein, the LAN MAC emulator 102 addresses various aspects of the WiFi protocols to insure that the originating applications found in higher OSI layers of the LAN-UWB hybrid device 100 are satisfied that their WiFi based requests and instructions are being properly treated by what appears to them as lower WiFi OSI layers, but in reality are lower OSI layers related to UWB., namely a peer IP PAL 102 layer also in OSI layer 2 directly below the LAN MAC emulator and a WPAN UWB MAC layer also in OSI layer 2 directly below the peer IP PAL. WiFi issues that are addressed by WiFi versions of the LAN MAC emulator 102 include scanning, authentication, association, request to send/clear to send(RTS/CTS), power save modes, and fragmentation.

Regarding scanning, the WiFi version of the LAN MAC emulator 102 configured as a PAL scans the peer IP PAL 104, such as the WiNet peer IP PAL 24, to sense the presence of TCP/IP data in media access slots of super-frames found in the UWB physical layer 18. If TCP/IP data is present, the LAN MAC emulator 102 notes the emulated channels with corresponding signal strengths. The LAN MAC emulator 102 also captures information about one or more UWB nodes the LAN-UWB hybrid device 100 is communicating with including service set identifier (SSID), supported data rates, etc. The LAN-UWB hybrid device 100 can also use this information for selection of a UWB node for future use. Other functions regarding scanning include the LAN MAC emulator 102 emulating and broadcasting WiFi probe frame contents with a probe response being sent out by an equivalent LAN MAC emulator in a selected UWB node.

Figure 6:
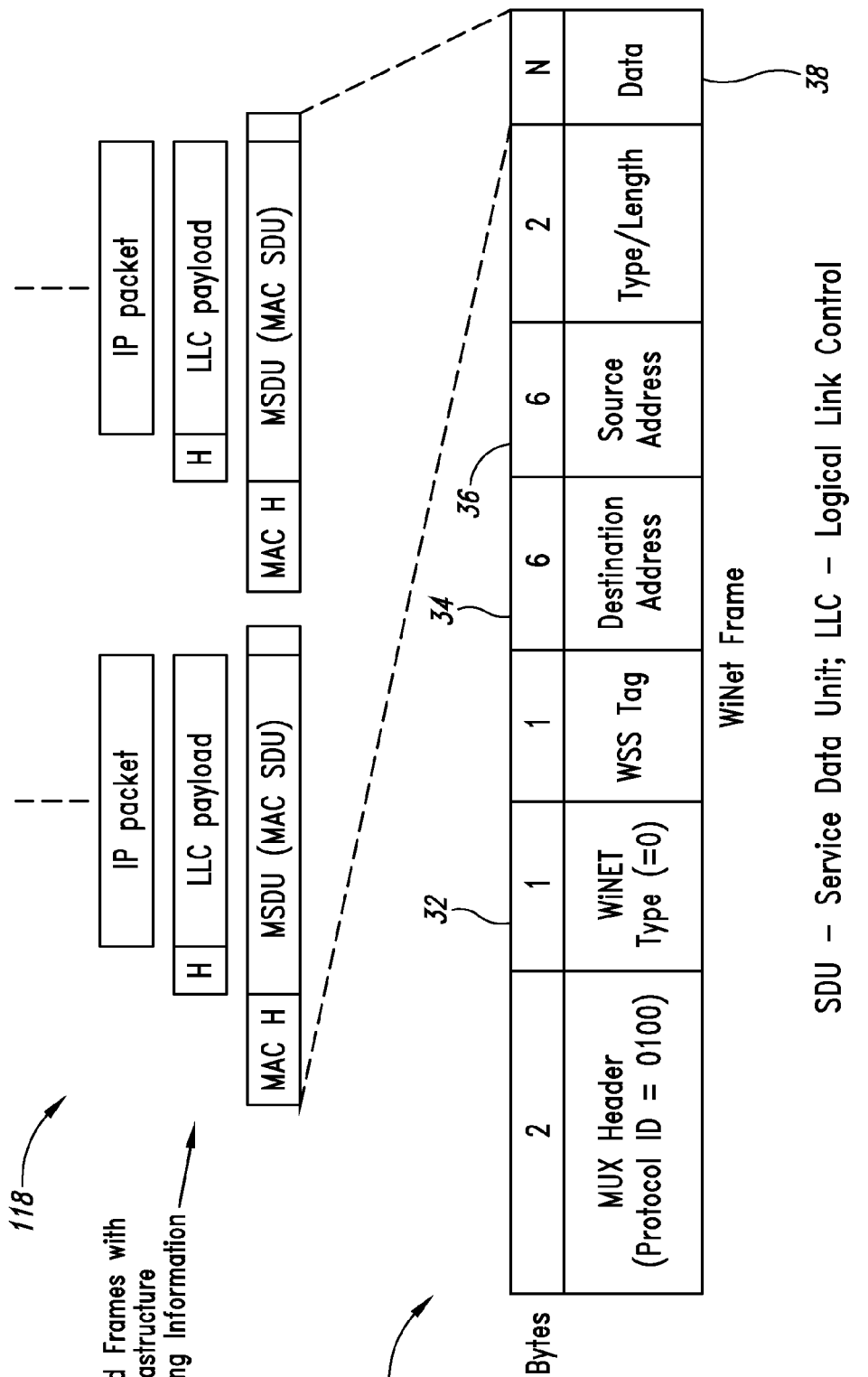
FIG. 6 depicts a package 118 of data including a WiNet Frame in which an authentication request frame is encapsulated in a data portion of the WiNet Frame.

Regarding authentication, the WiFi version of the LAN MAC emulator 102 configured as a PAL initiates processes by creating an authentication request frame and passes the authentication request frame on to the peer IP PAL 104, such as the WiNET peer IP PAL 24, which encapsulates the authentication request frame into a data portion 38 of the WiNet Frame 30, as shown in FIG. 6, to be received by the WPAN UWB MAC 106, such as the WiMedia WPAN UWB MAC 16, to be put into a slot 54 of a UWB super-frame 50 and subsequently sent out on the UWB physical layer 18. A corresponding UWB node, such as discussed below regarding FIG. 7, also has the LAN MAC emulator 102 and processes the super-frame 50 and the WiNet frame 30 as received by the UWB node, generates an authentication response frame containing an approval or disapproval, which is then inserted into another one of the super-frames 50 for transmission back to the LAN-UWB hybrid device 100.

Authentication processes with multi-stage procedures are processed in similar manner. With WiFi implementations an IEEE802.11i security standard may be addressed. Under this standard, Temporal Key Integrity Protocol (TKIP), Counter Mode with CBC-MAC Protocol (CCMP), Port-based authentication protocol (802.1x) with key management are processed in similar manner as described above. Other features such as secure IBSS, secure fast hand-off, secure deauthentication, disassociation and roaming functions are processed similarly.

Regarding association, the LAN MAC emulator 102 as a WiFi emulation PAL initiates the association process by emulating an association request frame containing elements such as SSID, supported data rates, etc. Furthermore, the LAN MAC emulator 102 creates an emulated response frame containing association identification and all relevant access point data. The response frame is passed on to the peer IP PAL 106, such as the WiNET peer IP PAL 24 for transmission in the WUSB super frame. With the association process completed successfully, the LAN-UWB hybrid device 100 and associated UWB node can exchange data. In some implementations, a large number of the LAN-UWB hybrid devices 100 with the LAN MAC emulator 102 as WiFi emulation PALs can associate with a IEEE802.11 MAC agent in a WUSB node.

Regarding request to send/clear to send (RTS/CTS), if the maximum frame length threshold is set for the RTS/CTS, the LAN MAC emulator 102, as a WiFi emulation PAL, initiates RTS/CTS process by emulating an RTS frame. The LAN MAC emulator 102 creates an emulated CTS response frame and forwards it to the peer IP PAL 104, such as the WiNET peer IP PAL 24, for insertion into a WUSB frame and subsequent transmission.

Regarding power save modes, the LAN MAC emulator 102, as a WiFi emulation PAL, coordinates power save modes found in the IEEE 802.11 standard or equivalent standards with the WUSB/ECMA standard such that the modes of the latter supersede those of the former.

Regarding fragmentation, if the maximum frame length threshold is set, the LAN MAC emulator 102, as the WiFi emulation PAL, activates a fragmentation algorithm which breaks single packet into multiple WiFi frames. The hand shake and data transmission is similar to RTS/CTS mode.

Figure 1:
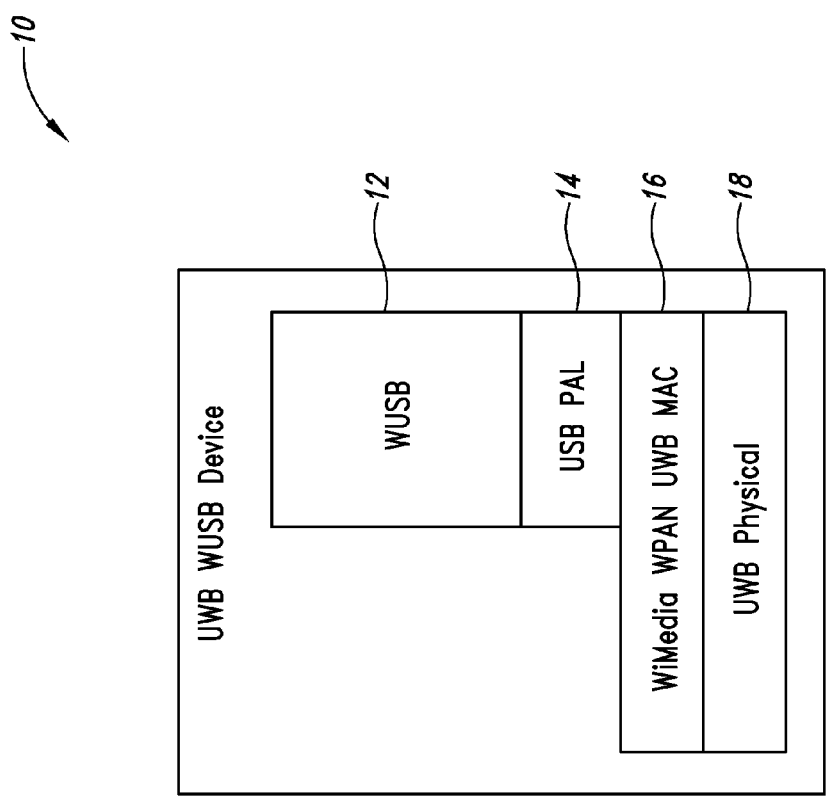
FIG. 1 is a diagram of a prior art ultra-wideband ("UWB") wireless universal serial bus ("WUSB") device.
Figure 2:
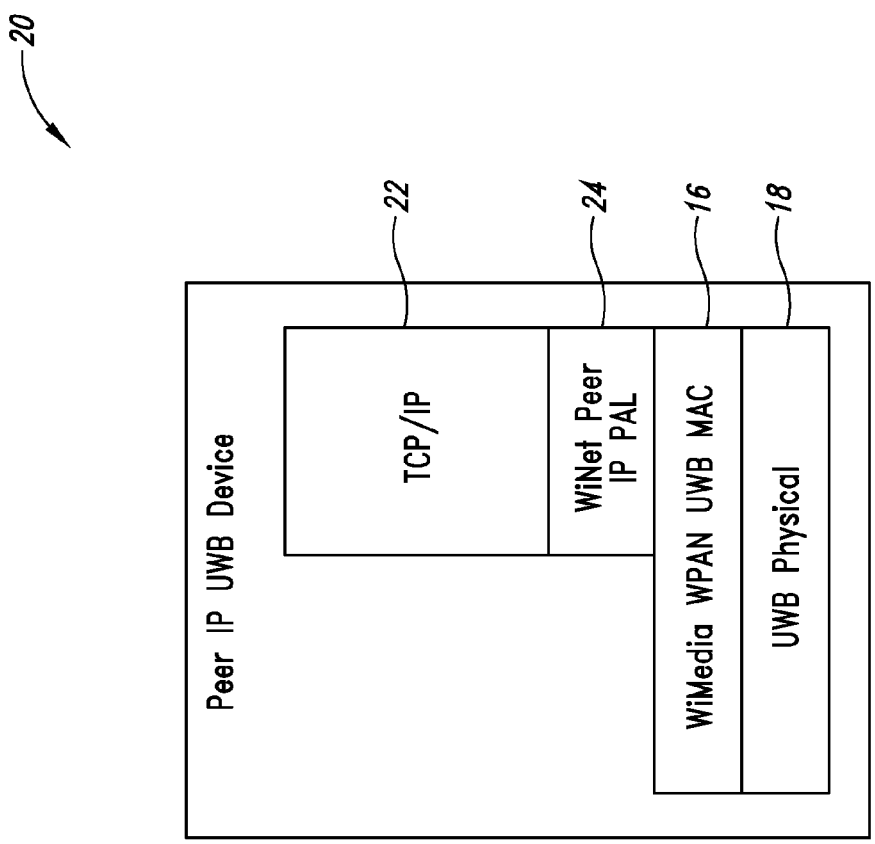
FIG. 2 is a diagram of a prior art Peer IP device having Transmission Control Protocol ("TCP") and Internet Protocol ("IP") protocol layers.
Figure 3:
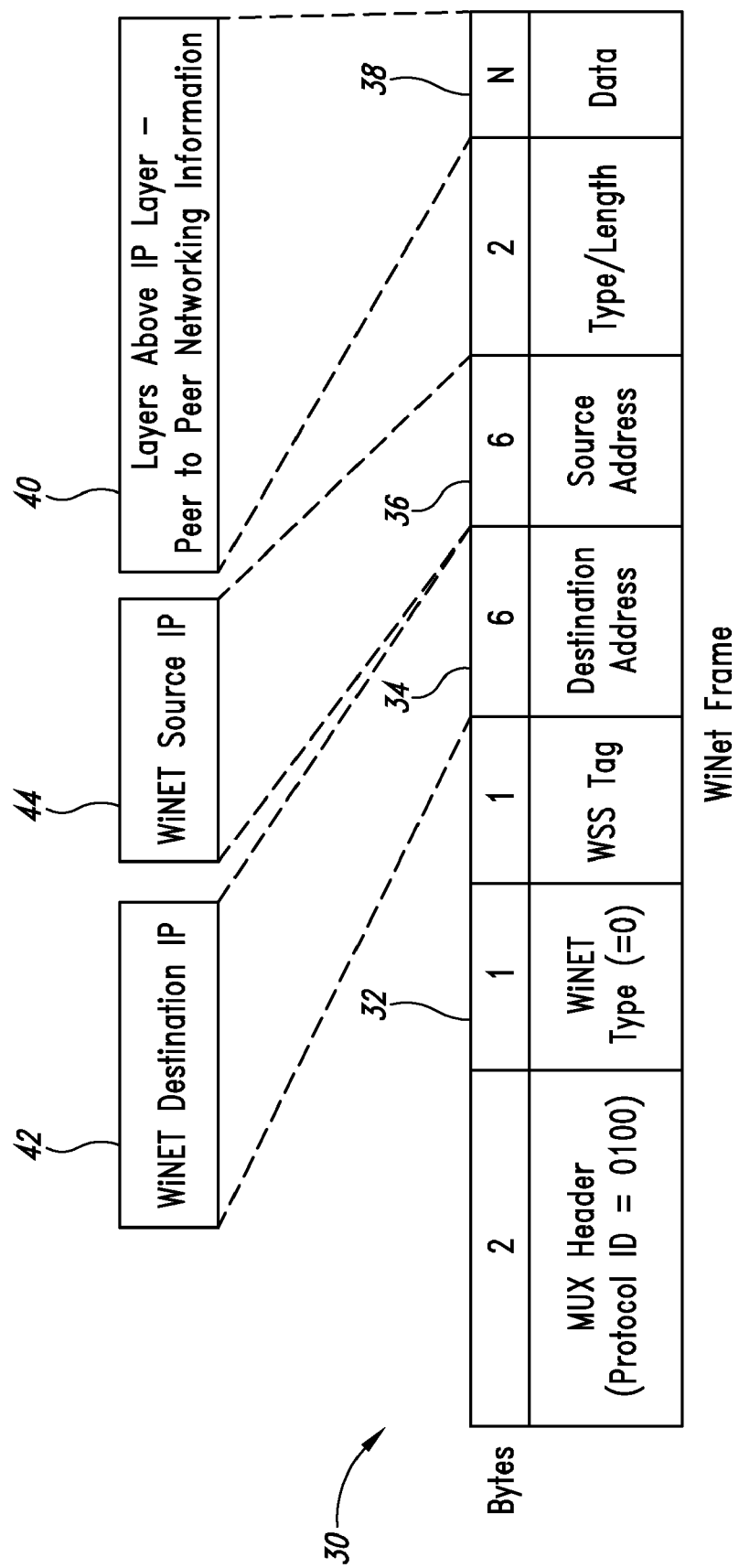
FIG. 3 depicts a prior art WiNet frame having a WiNet portion, a destination address portion, a source address, and a data portion.
Figure 4:
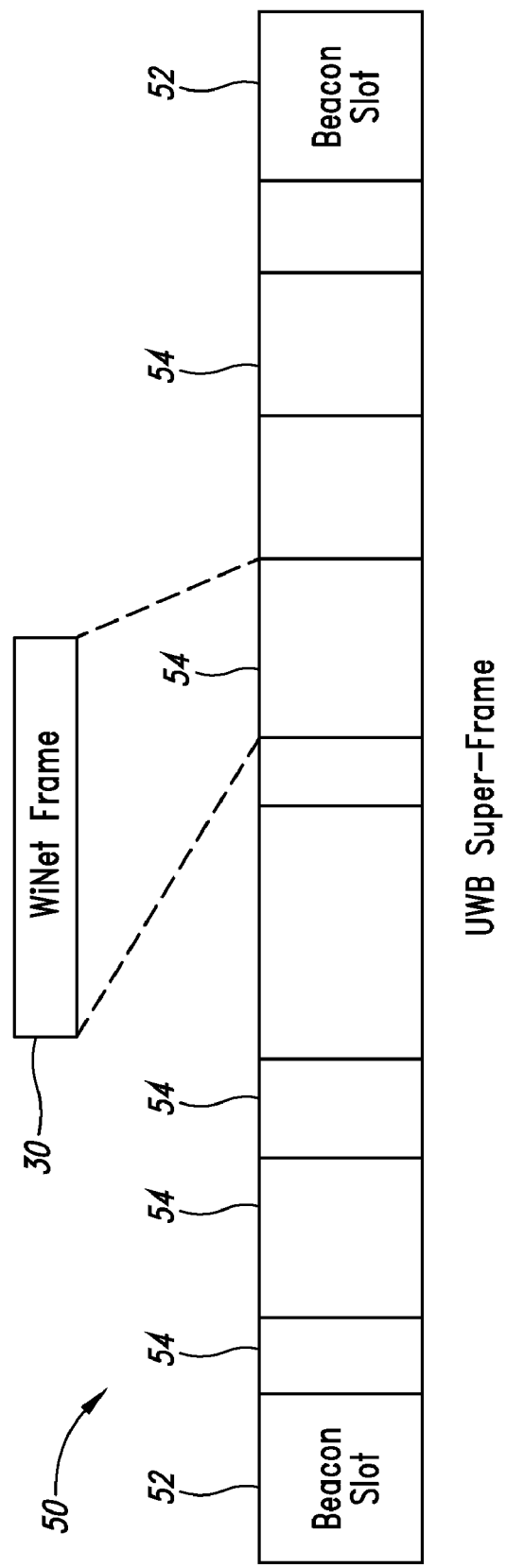
FIG. 4 depicts a prior art UWB super-frame including the WiNet frame of FIG. 3.

As discussed above, super-frames are used as the vehicle to transport data, instructions and other information in the UWB physical layer 18. FIG. 4 depicts in schematic form one copy of the UWB super-frame 50 that utilizes in particular the WiNet peer IP PAL 24 as evidenced by the WiNet frame 30 placed in the super-frame 50. The LAN MAC emulator 102 as a WiFi emulation PAL is configured to output a package 118 of data, addressing, other instructions, and other information regarding infrastructure networking instructions and information received from higher layers regarding WiFi and other aspects so that the WPAN UWB MAC 106, such as the WiMedia WPAN UWB MAC 16 is able to insert the package into the data portion 38 of the WiNet frame 30.

Consequently, content of the destination address portion 34 and the source address portion 36 of the WiNet 30 is unaffected by addressing and other instructions generated by LAN related applications, such as WiFi related applications and other upper layer applications of the LAN-UWB hybrid device 100. Content of the destination address portion 34 and the source address portion 36 are governed by processes related directly to the WiNet and may not be relevant with implementations since IP addressing related to WiNet may not be a factor in determining destinations. The PAN is serviced by the UWB physical layer 18 whether the WPAN is serviced by a standalone UWB node or whether other associated UWB nodes are interconnected through a meshing arrangement as discussed further below.

Figure 7:
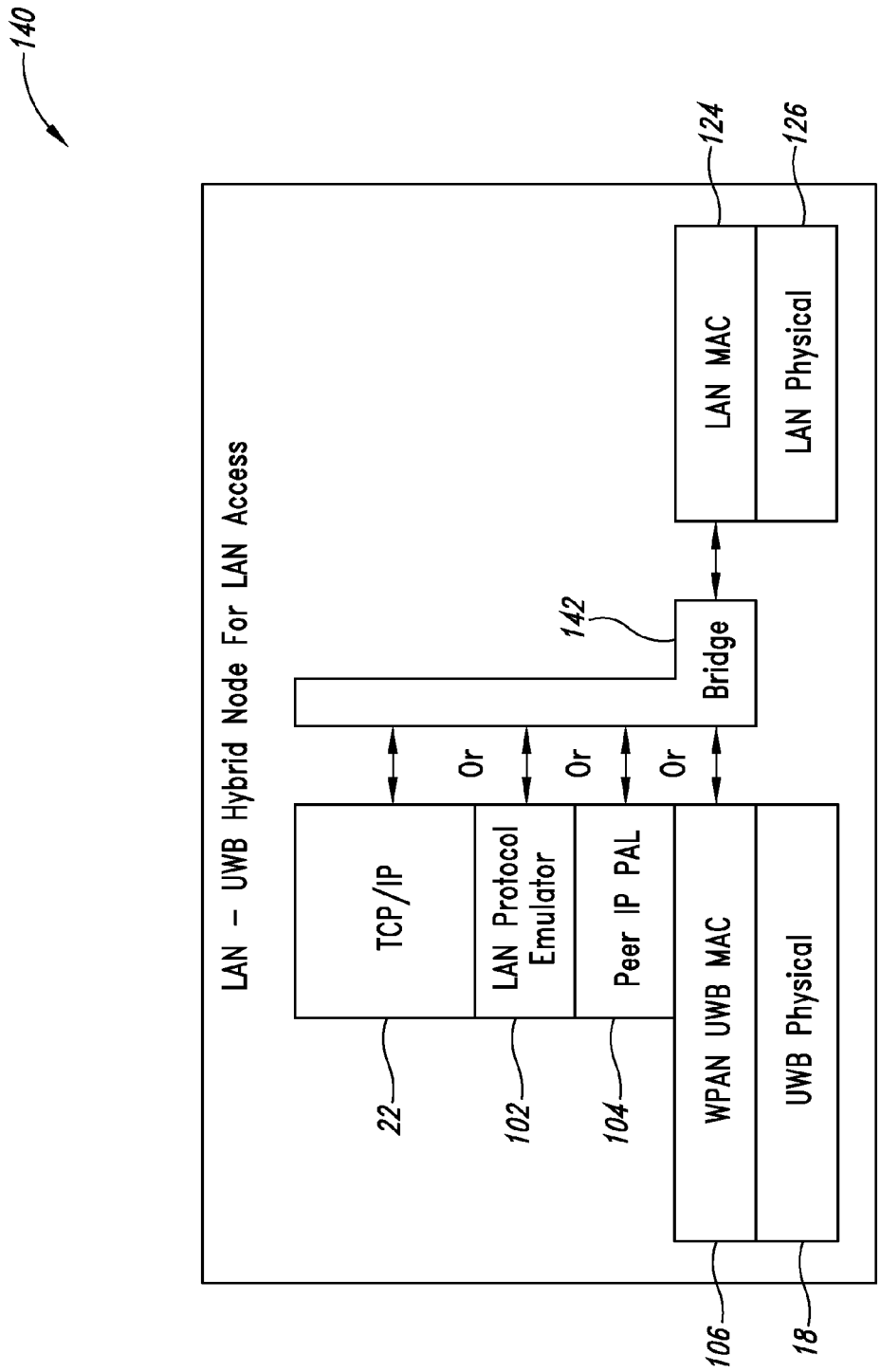
FIG. 7 is a diagram of a LAN UWB hybrid node for LAN access having a protocol stack, a bridge, a LAN MAC, and a LAN physical layer.

A LAN UWB hybrid node for LAN access 140 is shown in FIG. 7 as having a bridge 142, the LAN MAC 124, such as an IEEE 802.3 family MAC (that can include any version of the IEEE 802.3 family of protocol implementations), and the LAN physical layer 126, such as of the IEEE 802.3 family, that is coupled to a LAN, such as a LAN of the IEEE 802.3 family of implementations. The LAN UWB hybrid node 140 can communicate peer-to-peer with the LAN-UWB hybrid device 100 using UWB protocols. The LAN UWB hybrid node 140 uses the bridge 142 to establish LAN communication between the LAN UWB hybrid 100 and with a device on the LAN or another copy of the LAN UWB hybrid device 100 that can communicate with the same or another one of the LAN UWB hybrid nodes. The bridge 142 links to one or more layers of the TCP/IP 22, the LAN MAC emulator 102, the Peer IP PAL 104, and the WPAN UWB MAC 106. In implementations, the bridge 142 passes infrastructure networking instructions and information including addressing information that was stored in the data portion 38 of the WiNet frame 30 (or other equivalent frame generated by another type of the peer IP PAL 104) received by the LAN UWB hybrid node 140 to the LAN MAC 124. LAN packets containing data and other information that was stored in the data portion 108 can then be sent on to the LAN physical layer 126.

Figure 8:
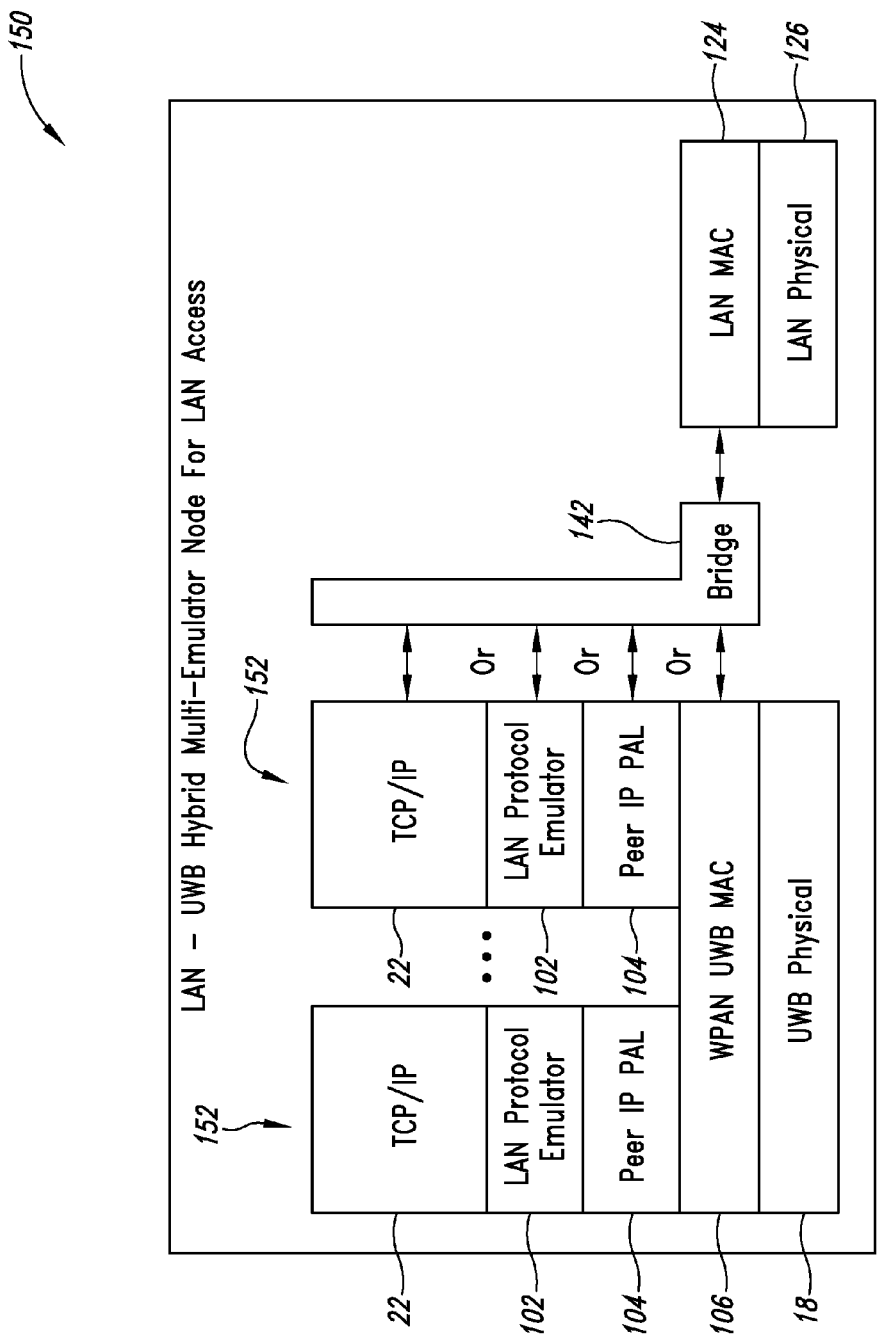
FIG. 8 is a diagram of a LAN-UWB hybrid multi-emulator node for LAN access having two of the same protocol stack found in the LAN UWB hybrid node of FIG. 7.

A LAN-UWB hybrid multi-emulator node for LAN access 150 is shown in FIG. 8 as having two of the same protocol stack 152 found in the LAN UWB hybrid node 140. Multiple copies of the protocol stack 152 provides flexibility in managing traffic from a plurality of LAN-UWB hybrid devices 100 through a single hardware configuration.

A multi-access UWB device 160 is shown in FIG. 9 as having the protocol stacks of the UWB WUSB device 10, the peer IP UWB device 20, and the LAN-UWB hybrid device 100. Consequently, the multi-access UWB device 160 has shares the same functionality as discussed above for these separate devices.

A multi-access UWB multi-function node for LAN access 170 having a bridge 172 is shown in FIG. 10 as having the protocol stacks of the LAN UWB hybrid node 150 and the mulit-access UWB device 160. Consequently, the multi-access UWB multi-function node 170 and the bridge 172 share the same functionality as discussed above.

Figure 12:
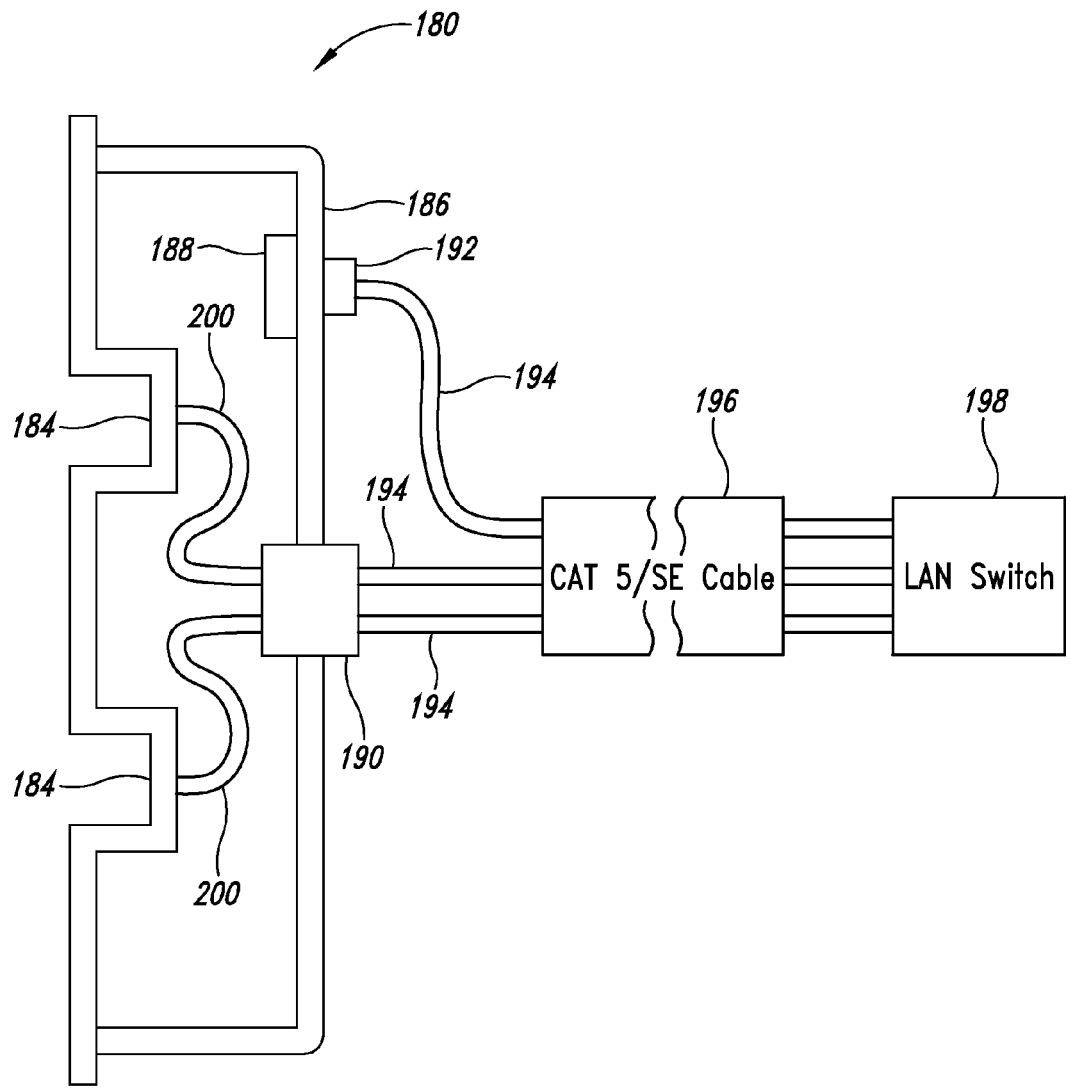
FIG. 12 depicts components of the wallplate of FIG. 11.

A wallplate 180 is shown in FIG. 11 as having a cover plate 182 and two RJ-45 jacks 184 for connectivity with an IEEE 802 LAN such as LAN versions of IEEE 802.3. As shown in FIG. 12, the wallplate 180 further contains a circuit board 186 that has components including a UWB radio 188 as part of one of the UWB nodes discussed herein. The wallplate 180 has a first cable connector 190 and a second cable connector 192 to receive cable sets 194 of network cable, such as from a Cat 5 or a Cat 5E network cable 196 connected with a LAN switch 198. Patch cables 200 connect the jacks 184 to the first cable connector 190 and the UWB radio 188 is coupled to the second cable connector 190. Use of the first connector 190 and the second connector 192 allow for circuit isolation for testing purposes.

Figure 13:
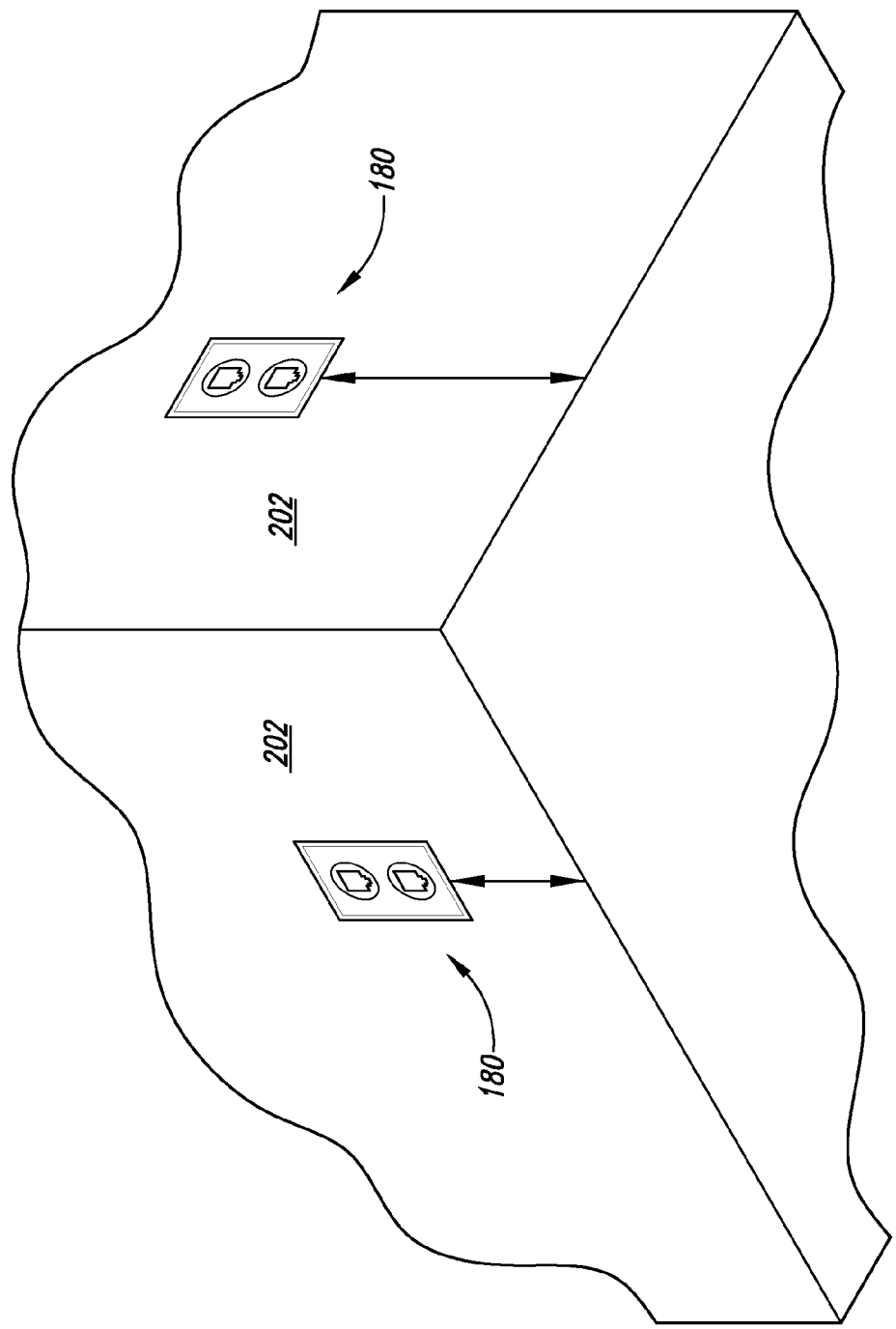
FIG. 13 depicts a couple of the wallplates of FIG. 11 mounted on walls.

A couple of the wallplates 180 are shown in FIG. 13 as being mounted on walls 202. Since the UWB radios 188 do not need line of sight for reception, the wallplates can be mounted at various desired heights without substantially affecting reception.

Figure 14:
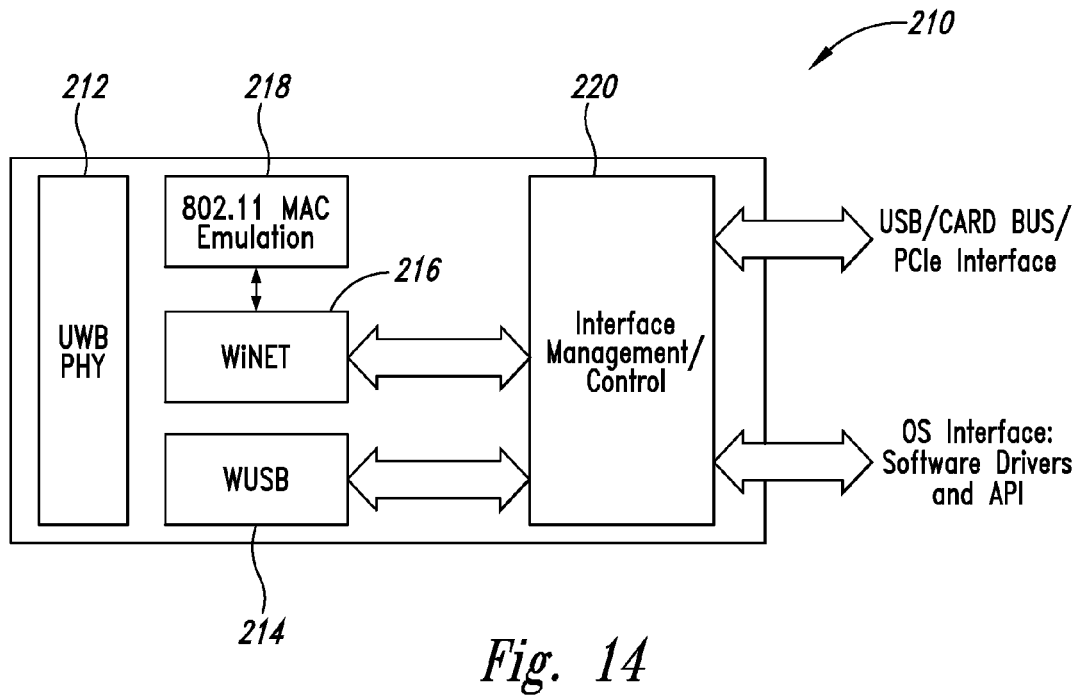
FIG. 14 is a diagram of a WiFi implementation of the multi-access UWB device of FIG. 9 on a computer card.

A WiFi implementation of the multi-access UWB device 160 on a computer card 210 is shown in FIG. 14. The computer card 210 is configured to be installed into a computer workstation or other type of computer. The computer card 210 has a UWB Physical component 210, a WUSB component 214, a WiNet 216, and a WiFi MAC emulation component 218 that implement the layers discussed above. Further included is an interface management control 220 that handles communication with the computer system regarding USB, computer bus and other interfaces such as Peripheral Component Interconnect (PCI). The interface management control 220 also handles communication with the computer operating system and applications of interest through software drivers, application program interfaces, etc.

Figure 15:
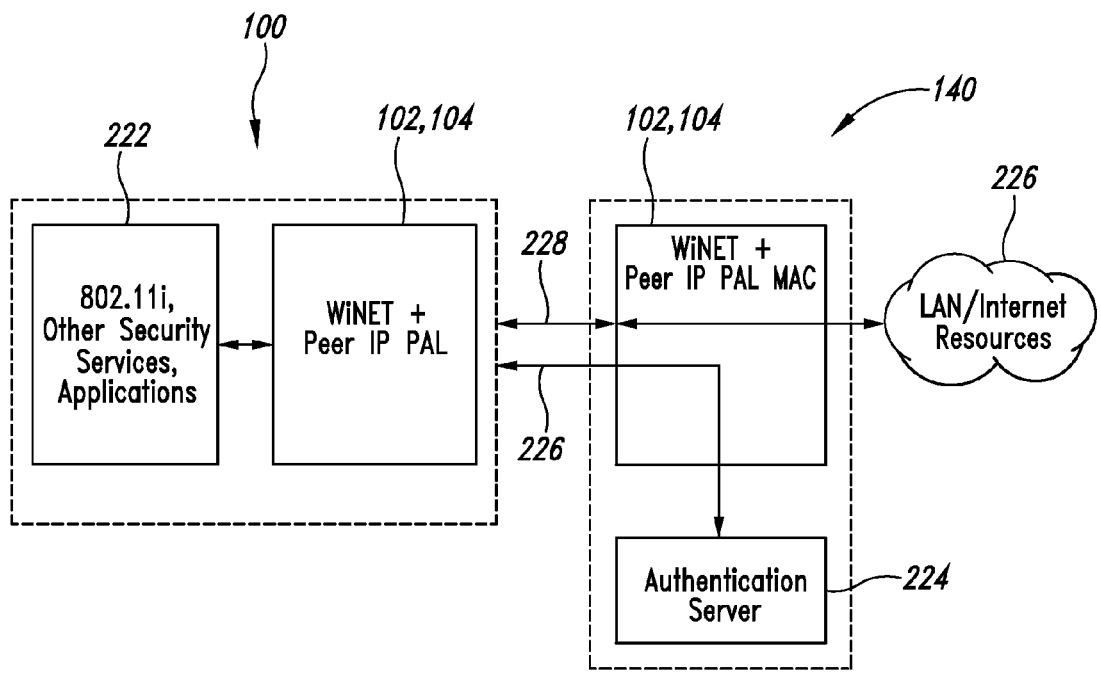
FIG. 15 is a diagram of WiFi versions of the LAN-UWB hybrid device of FIG. 5 and the LAN-UWB hybrid node of FIG. 7 having upper level WiFi applications and an authentication server, respectively.

A WiFi versions of the LAN-UWB hybrid device 100 and the LAN-UWB hybrid node 140 are shown in abbreviated form in FIG. 15 as having upper level WiFi applications 222 and an authentication server 224, respectively. The LAN-UWB hybrid device 100 first sends an authentication request 226 to the LAN-UWB hybrid node 140. Once the authentication server 224 approves the authentication request 226, the LAN-UWB hybrid device 100 can send data and other information 228 through the LAN-UWB hybrid node 140 to a LAN or Internet resource 226.

Figure 16:
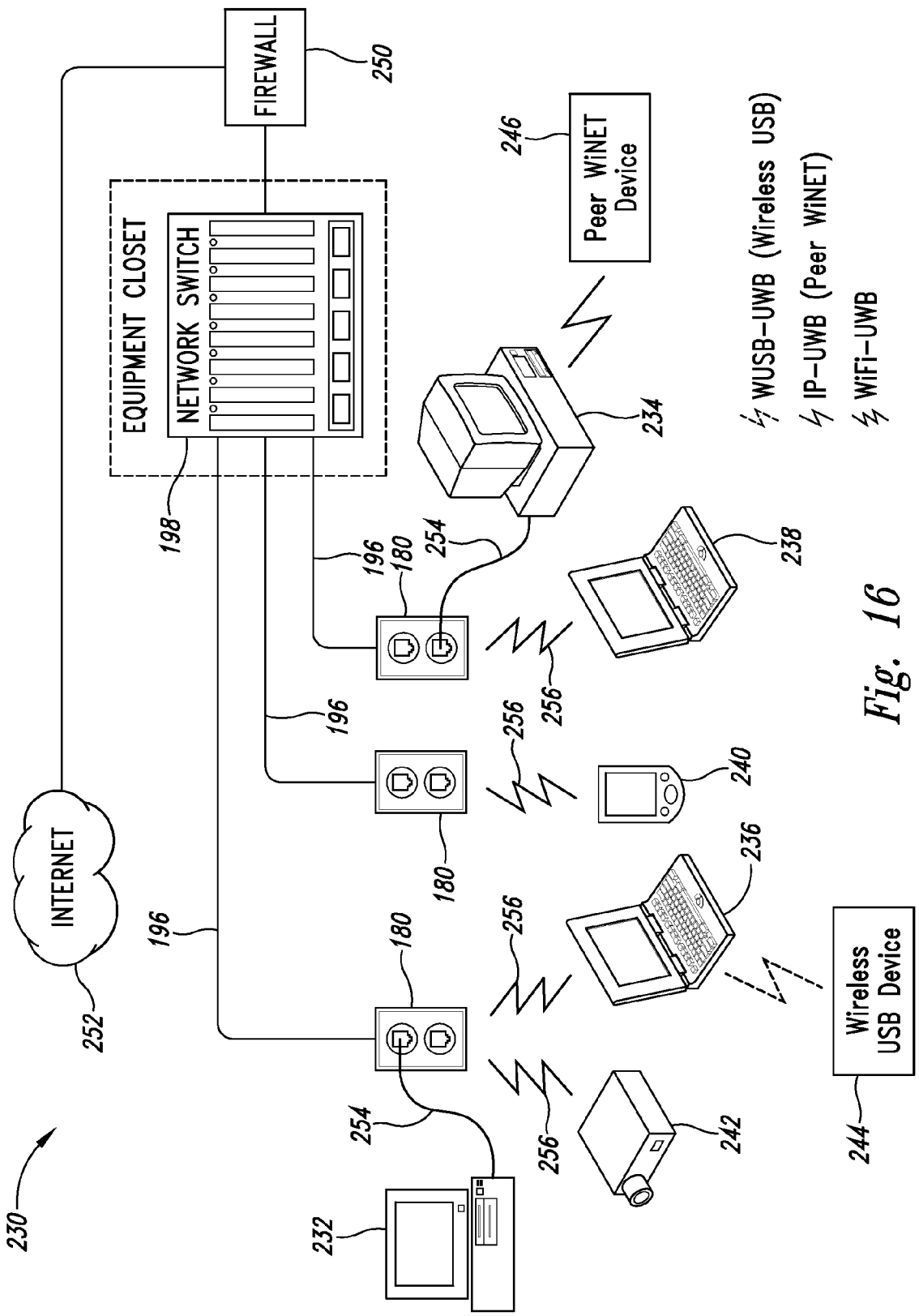
FIG. 16 is a diagram of a first exemplary topology including five computers, a projector, a wireless USB device, a peer WiNet device, a network switch, a firewall, and the Internet.

A first exemplary topology 230 is shown in FIG. 16 as having a first computer 232, a second computer 234, a third computer 236, a fourth computer 238, a fifth computer 240, a projector 242, a wireless USB device 244, a peer WiNet device 246, a network switch 248, a firewall 250, and the Internet 252. The first computer 232 and the second computer 234 are communicatively linked to the wallplates 180 through patch cables and consequently the LAN of the network switch 248 without need of bridging since LAN protocols are communicated across the patch cables through the wall plates and the network cable 196 to the LAN network switch 198. The third computer 236, the fourth computer 238, the fifth computer 240, and the projector 242 are communicatively linked to the wallplates 180 through UWB super-frames 256 as instances of the LAN-UWB hybrid device 100. As explained above, the UWB super-frames 256 contain infrastructure tye LAN instructions and information including addressing in the data portions 38 of WiNet frames 30 (or equivalent frames generated by other of the peer IP PALs 104). The wallplates 180 are configured as having at least the functionality of the LAN-UWB hybrid node 140 with the bridge 142.

As an example, the third computer 236 is to send data to the fourth computer 238. First, the third computer 236 as one of the LAN-UWB hybrid devices 100 originates one of the UWB super-frames 110 to contain infrastructure LAN addressing in the data portion 38 of the WiNet frame (or equivalent frame generated by another type of the peer IP PALs 104). The wallplate 180 of the third computer 236 receives the UWB super-frame 110. The LAN MAC emulator 102 of the wallplate 180 extracts the infrastructure LAN addressing from the WiNet frame 30 and sends data and other information as one or more LAN packets to the network switch 198 through the bridge 142 with the LAN addressing by processed via LAN routing protocols. The network switch 148 then reads the LAN destination address of the LAN packets and switches the LAN packets to be sent out on the network cable 196 that is connected the wallplate 180 of the fourth computer 238.

The LAN MAC emulator 102 of the walllplate 180 of the fourth computer 238 uses a table to translate the infrastructure LAN address to a UWB destination address to be placed in the super-frame 50 to be sent to the fourth computer 238 so that other UWB devices in the WPAN of the fourth computer 238 do not need to also receive the super-frame. The table is kept up to date by having the bridge 142 observe the UWB source addresses and corresponding LAN source addresses found in the super-frames 50 being received by the bridge from UWB devices on the WPAN of the bridge.

For discussion purposes below, a UWB spectrum plot 260 is shown in FIG. 17 as being divided into five band groups. Band group 1 is noted as being mandatory and the other band groups are noted as being optional.

A multi-access UWB-UWB mesh node 270 includes the protocol stacks of the multi-access UWB device 160 that uses a first UWB transceiver operating on a first one of the band groups indicated as band group A and additional meshing protocol stack 272 that use a second UWB transceiver operating on a second one of the band groups indicated as band group B and different than the band group A. Since band group 1 is mandatory, in some implementations band group 1 is assigned as band group A and one of the other five band groups is assigned as band group B.

In some of the implementations, the band group A is used for sending data between various of the UWB-UWB mesh nodes 270 and the band group B is used to update and coordinate routing information between each of the UWB-UWB mesh nodes 270. The meshing protocol stack 272 include mesh upper layer functions 274, a mesh adaptation layer 276, mesh protocols 278, and a UWB physical layer 18 for band group B. The mesh upper layer functions 274 include routing algorithms.

The mesh adaptation layer 276 is a PAL that can act as a bridge between the two independent UWB physical layers 18 and provides a mechanism to share between the two. The mesh adaptation layer 276 can have a common data base that contains maximal path information and media access coordination to be maintained. The mesh adaptation layer 276 feeds routing information to the WPAN UWB MAC 106 routing table for relatively fast and up to date routing parameters.

The mesh adaptation layer 276 includes a routing table that is updated through meshing functions of the meshing protocol stack 272 as the UWB-UWB mesh nodes 270 update each other as to their status and recommend routing. The routing table of the mesh adaptation layer 276 is shared with the WPAN UWB MAC 106 to determine UWB destination addresses for UWB super-frames 110 being originated by the WPAN UWB MAC. The mesh protocols 298 can serve as a MAC to implement such wireless mesh protocol functions as mesh topology learning, path selection and forwarding, mesh network measurements, mesh media access coordination, mesh security (proprietary or standard protocols, e.g, IEEE802.11i).

Shown in FIG. 19 is a multi-access UWB-UWB mesh node with LAN access 280 has the protocol stacks of the UWB-UWB mesh nodes 270 with the addition of the bridge 172 and the second LAN MAC emulator protocol stack of the multi-access UWB multi-emulator node 170. The multi-access UWB-UWB mesh node 280 consequently has the functionality of the multi-access UWB multi-emulator node 170 with the additional of the meshing functionality of the UWB-UWB mesh node 270.

Shown in FIG. 20 is a multi-access UWB-WiFi mesh node 290 that has the functionality of the multi-access UWB-UWB mesh node 270, but has a protocol stack 292 for meshing that is based upon WiFi. The protocol stack 292 has a mesh upper layer function 294, a mesh adaptation layer 276, a mesh protocols layer 278, and a WiFi physical layer 300 that uses a WiFi transceiver. Shown in FIG. 21 is a multi-access UWB-WiFi mesh node with LAN access 310 that has the functionality of the multi-access UWB-UWB mesh node with LAN access 280 but uses WiFi for meshing similar to the multi-access UWB-WiFi mesh node 290.

A hardware implementation 320 of the mulit-access UWB-UWB mesh node 280 and the multi-access WUB-WiFi mesh node 310 is shown in FIG. 22 to include a LAN interface, a physical layer component 324, a network processor 326, flash memory 328, and DRAM 330, and first UWB transceiver radio 332 for data transmission and a second transceiver radio 334 for meshing. The second transceiver radio 334 has a UWB version for the multi-access UWB-UWB mesh node 280 and a WiFi version for the multi-access UWB-WiFi mesh node 310. An implementation of the network processor 326 is shown in FIG. 23 as having a CPU 336, flash controllers 338, 1-cache 340, 0-cache 342, SRAM 344, and an I/O controller 346.

An exemplary topology 350 is shown in FIG. 24 in which originated super-frames 352 are sent to the wallplates 180 of the WPANs of the originating devices. The originated super-frames 352 are sent on to others of the wallplates as forwarded super-frames 354 based upon routing determined by the UWB meshing protocol stacks 272 and/or WiFi meshing protocol stacks 292 depending upon which radio technology the wallplates 180 are using for meshing.

An exemplary topology 360 is shown in FIG. 25 as having mesh WPAN nodes 362, mesh router nodes 364, and mesh bridge nodes 366. Depending upon whether the UWB or WiFi is used with the meshing protocol stack, the mesh WPAN nodes 362 and the mesh router nodes 364 use the multi-access UWB-UWB mesh nodes 270 when UWB is used for meshing and use the multi-access UWB-WiFi mesh nodes 290 when WiFi is used for meshing. The mesh bridge nodes 366 use the multi-access UWB-UWB mesh node 280 when UWB is used for meshing and use the multi-access UWB-WiFi mesh node 310 when WiFi is used for meshing.

In one or more various embodiments, related systems include but are not limited to circuitry and/or programming for effecting the foregoing-referenced method embodiments; the circuitry and/or programming can be virtually any combination of hardware, software, and/or firmware configured to effect the foregoing-referenced method embodiments depending upon the design choices of the system designer.

The foregoing is a summary and thus contains, by necessity; simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein. Those having ordinary skill in the art will recognize that the environment depicted has been kept simple for sake of conceptual clarity, and hence is not intended to be limiting.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams and examples. Insofar as such block diagrams and examples contain one or more functions and/or operations, it will be understood as notorious by those within the art that each function and/or operation within such block diagrams or examples can be implemented, individually and/or collectively, by a wide range of hardware, software, firmware, or virtually any combination thereof. In one embodiment, the present invention may be implemented via application specific integrated circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more data processing systems), as one or more programs running on one or more controllers (e.g., microcontrollers) as one or more programs running on one or more processors e.g., microprocessors, as firmware, or as virtually any combination thereof, and that designing the circuitry and/or writing the code for the software and or firmware would be well within the skill of one of ordinary skill in the art in light of this disclosure.

Furthermore, although the various protocol stacks were presented as having individual protocol layers e separate entities involved, for instance, one example would be that the LAN MAC emulator 102, the Peer IP PAL 104, and the WPAN UWB MAC were presented in certain implementations as being separate protocol layers. However, this is not be interpreted as the separately presented protocol layers could not be implemented in a reduced number of entities or a single entity as an option to implementing each separately presented protocol layer in individual entities. For instance, the functions of the above described PALs can be accomplished within an associated MAC layer and is applicable to technologies including pure WUSB protocols and also to WUSB certralized architecture models and decentralized distributed architecture models.

In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into data processing systems. That is, the devices and/or processes described herein can be integrated into a data processing system via a reasonable amount of experimentation.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system for an infrastructure data network configured to support network traffic at least other than peer-to-peer network traffic based on a first network protocol, the system comprising:

a first device configured to generate infrastructure network addressing instructions according to a second network protocol, place the infrastructure network addressing instructions into a data portion of a first ultra-wideband super-frame, and transmit the data portion of the first super-frame wirelessly to a first ultra-wideband address, the infrastructure network addressing instructions being other than peer-to-peer network addressing instructions;

an intermediate device associated with the first ultra-wideband address and spaced apart from the first device, the intermediate device being configured to receive the data portion of the first super-frame from the first device, extract the infrastructure network addressing instructions from the data portion of the first super-frame, identify a second ultra-wideband address using the extracted infrastructure network addressing instructions, place the infrastructure network addressing instructions into a data portion of a second ultra-wideband super-frame, and transmit the data portion of the second super-frame wirelessly to the second ultra-wideband address; and a second device associated with the second ultra-wideband address and spaced apart from both the first device and the intermediate device, the second device being configured to receive the data portion of the second super-frame from the intermediate device, extract the infrastructure network addressing instructions from the data portion of the second super-frame, and translate the infrastructure network addressing instructions into the first network protocol, and provide the infrastructure network addressing instructions translated into the first network protocol to the infrastructure data network.

2. The system of claim 1 wherein the first device includes a wireless personal area network ("WPAN") ultra-wide band ("UWB") media access control ("MAC") layer and an ultra-wide band physical layer.

3. The system of claim 1 wherein the first device includes a local area network ("LAN") protocol emulator and a peer Internet protocol ("IP") protocol adaptation layer ("PAL").

4. The system of claim 3 wherein the peer IP PAL is a WiNet peer IP PAL.

5. The system of claim 3 wherein the second device includes a bridge configured to provide the infrastructure network addressing instructions translated into the first network protocol to the infrastructure data network.

6. The system of claim 3 wherein the first device includes a wireless personal area network ("WPAN") ultra-wide band ("UWB") media access control ("MAC") layer and a UWB physical layer.

7. The system of claim 3 wherein the peer IP PAL is a WiNet peer IP PAL.

8. The system of claim 3 wherein the first protocol is of the IEEE 802.3 family of protocols and the second protocol is of the IEEE 802.11 family of protocols.

9. The system of claim 3 wherein the first protocol is of the IEEE 802.3 family of protocols and the second protocol is of the IEEE 802.3 family of protocols.

10. The system of claim 3 wherein the infrastructure network addressing instructions are contained within at least one data packet.

11. The system of claim 1 wherein the first protocol is of the IEEE 802.3 family of protocols and the second protocol is of the IEEE 802.11 family of protocols.

12. The system of claim 11 wherein the second device includes a bridge.

13. The system of claim 11 wherein the first device includes a wireless personal area network ("WPAN") ultra-wide band ("UWB") media access control ("MAC") layer and a UWB physical layer.

14. The system of claim 11 wherein the first device includes a local area network ("LAN") protocol emulator and a peer Internet protocol ("IP ") protocol adaptation layer ("PAL").

15. The system of claim 14 wherein the peer IP PAL is a WiNet peer IP PAL.

16. The system of claim 11 wherein the infrastructure network addressing instructions are contained within at least one data packet.

17. The system of claim 1 wherein the first protocol is of the IEEE 802.3 family of protocols and the second protocol is of the IEEE 802.3 family of protocols.

18. The system of claim 17 wherein the second device includes a bridge configured to provide the infrastructure network addressing instructions translated into the first network protocol to the infrastructure data network.

19. The system of claim 17 wherein the first device includes a wireless personal area network ("WPAN") ultra-wide band ("UWB ") media access control ("MAC") layer and a UWB physical layer.

20. The system of claim 17 wherein the first device includes a local area network ("LAN") protocol emulator and a peer Internet protocol ("IP") protocol adaptation layer ("PAL").

21. The system of claim 20 wherein the peer IP PAL is a WiNet peer IP PAL.

22. The system of claim 17 wherein the infrastructure network addressing instructions are contained within at least one data packet.

23. The system of claim 1 wherein the infrastructure network addressing instructions are contained within at least one data packet.

24. The system of claim 1 wherein the second device includes a bridge configured to provide the infrastructure network addressing instructions translated into the first network protocol to the infrastructure data network.

25. A method performed by a mesh network comprising a first device, a second device associated with a first ultra-wideband address, and a third device associated with a second ultra-wideband address and coupled to an infrastructure data network, the infrastructure data network being configured to support network traffic at least other than peer-to-peer network traffic based on a first network protocol, the method comprising:

with the first device:

generating infrastructure network addressing instructions according to a second network protocol, the infrastructure network addressing instructions being other than peer-to-peer network addressing instructions, placing the infrastructure network addressing instructions into a data portion of a first ultra-wideband super-frame, and transmitting the data portion of the first super-frame wirelessly to the first ultra-wideband address;

with the second device:

receiving the data portion of the first super-frame transmitted to the first ultra-wideband address, extracting the infrastructure network addressing instructions from the data portion of the first super-frame, identifying the second ultra-wideband address using the extracted infrastructure network addressing instructions, placing the infrastructure network addressing instructions into a data portion of a second ultra-wideband super-frame, and transmitting the data portion of the second super-frame to the second ultra-wideband address; and with the third device:

receiving the data portion of the second super-frame transmitted to the second ultra-wideband address, extracting the infrastructure network addressing instructions from the data portion of the second super-frame, translating the infrastructure network addressing instructions into the first network protocol, and providing the infrastructure network addressing instructions translated into the first network protocol to the infrastructure data network.

26. The method of claim 25 wherein the infrastructure network addressing instructions are contained within at least one data packet.

27. The method of claim 25 wherein the first protocol being of the IEEE 802.3 family of protocols and the second protocol being of the IEEE 802.11 family of protocols.

28. The method of claim 27 wherein the infrastructure network addressing instructions are contained within at least one data packet.

29. The method of claim 25 wherein the first protocol is of the IEEE 802.3 family of protocols and the second protocol is of the IEEE 802.11 family of protocols.

30. The method of claim 29, wherein the infrastructure network addressing instructions are contained within at least one data packet.

31. The method of claim 25 wherein identifying the second ultra-wideband address using the extracted infrastructure network addressing instructions comprises looking at least a portion of the extracted infrastructure network addressing instructions up in a table.

32. A system for an infrastructure data network configured to support network traffic at least other than peer-to-peer network traffic based on a first network protocol, the system comprising:

a first device including:

means for generating infrastructure network addressing instructions according to a second network protocol, the infrastructure network addressing instructions being other than peer-to-peer network addressing instructions; and means for transmitting the infrastructure network addressing instructions in a data portion of a first ultra-wideband super-frame;

a second device associated with the first ultra-wideband address and spaced apart from the first device, the second device comprising:

means for receiving the data portion of the first super-frame from the first device, means for extracting the infrastructure network addressing instructions from the data portion of the first super-frame, means for identifying a second ultra-wideband address using the extracted infrastructure network addressing instructions, and means for transmitting the infrastructure network addressing instructions in a data portion of a second super-frame wirelessly to the second ultra-wideband address; and a third device associated with the second ultra-wideband address and spaced apart from both the first and second devices, the third device including:

means for receiving the data portion of the second super-frame from the second device;

means for extracting the infrastructure network addressing instructions from the data portion of the second super-frame; and means for providing the infrastructure network addressing instructions according to the first network protocol to the infrastructure data network.

33. The system of claim 32, wherein the third device further comprises:

means for converting the infrastructure network addressing instructions into the first network protocol.

34. A method performed by a mesh network comprising a first mesh bridge device, a plurality of mesh intermediate devices each associated with a unique ultra-wideband address, and a second mesh bridge device associated with a unique ultra-wideband address and coupled to an infrastructure data network, the infrastructure data network being configured to support network traffic at least other than peer-to-peer network traffic based on a first network protocol, the method comprising:

with the first mesh bridge device:

generating infrastructure network addressing instructions according to a second network protocol, the infrastructure network addressing instructions being other than peer-to-peer network addressing instructions, transmitting the infrastructure network addressing instructions in a data portion of a super-frame wirelessly to an ultra-wideband address associated with a selected one of the plurality of mesh intermediate devices;

until the infrastructure network addressing instructions are transmitted wirelessly to the second mesh bridge device in a data portion of a super-frame, with the selected mesh intermediate device:

receiving the infrastructure network addressing instructions in a data portion of a super-frame transmitted to the ultra-wideband address associated with the selected mesh intermediate device, identifying an ultra-wideband address using the extracted infrastructure network addressing instructions, if the identified ultra-wideband address is associated with one of the plurality of mesh intermediate devices, transmitting the infrastructure network addressing instructions in a data portion of a super-frame to the one of the plurality of mesh intermediate devices associated with the ultra-wideband address, thereby defining the one of the plurality of mesh intermediate devices associated with the ultra-wideband address as the selected mesh intermediate device, and if the identified ultra-wideband address is associated with the second mesh bridge device, transmitting the infrastructure network addressing instructions in a data portion of a super-frame to the second mesh bridge device; and after the infrastructure network addressing instructions are transmitted wirelessly to the second mesh bridge device in a data portion of a super-frame, with the second mesh bridge device:

receiving the data portion of the super-frame comprising the infrastructure network addressing instructions, extracting the infrastructure network addressing instructions from the data portion of the super-frame, translating the infrastructure network addressing instructions into the first network protocol, and providing the infrastructure network addressing instructions translated into the first network protocol to the infrastructure data network.

\* \* \* \* \*